United States Patent
Chen et al.

(10) Patent No.: US 10,750,494 B2
(45) Date of Patent: Aug. 18, 2020

(54) MANAGEMENT OF DYNAMIC TRANSMISSION TIME INTERVAL SCHEDULING FOR LOW LATENCY COMMUNICATIONS

(71) Applicant: QUALCOMM Incorporated, San Diego, CA (US)

(72) Inventors: Wanshi Chen, San Diego, CA (US); Peter Gaal, San Diego, CA (US); Shimman Arvind Patel, San Diego, CA (US); Hao Xu, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 15/067,554

(22) Filed: Mar. 11, 2016

(65) Prior Publication Data
US 2016/0295584 A1 Oct. 6, 2016

Related U.S. Application Data

(60) Provisional application No. 62/140,667, filed on Mar. 31, 2015.

(51) Int. Cl.
*H04W 72/04* (2009.01)
*H04L 5/00* (2006.01)

(52) U.S. Cl.
CPC ......... *H04W 72/0446* (2013.01); *H04L 5/001* (2013.01); *H04L 5/0048* (2013.01); *H04L 5/0053* (2013.01)

(58) Field of Classification Search
None
See application file for complete search history.

(56) References Cited

U.S. PATENT DOCUMENTS

| 9,119,119 B2 | 8/2015 | Balasubramanian et al. |
| 2007/0064669 A1* | 3/2007 | Classon ............... H04L 1/1822 370/347 |

(Continued)

FOREIGN PATENT DOCUMENTS

| CN | 101170809 A | 4/2008 |
| CN | 104067683 A | 9/2014 |

(Continued)

OTHER PUBLICATIONS

Alcatel-Lucent et al., "Capability and TTI Preference Indication for RACH Fallback & 2/10 ms TTI Concurrent Operations in CELL_FACH," 3GPP TSG-RAN WG2 Meeting #78, Prague, Czech Republic, R2-122118, May 21-25, 2012, 6 pgs., 3rd Generation Partnership Project.

(Continued)

*Primary Examiner* — Ayaz R Sheikh
*Assistant Examiner* — Mariela Vidal Carpio
(74) *Attorney, Agent, or Firm* — Dalei Dong; Holland & Hart LLP

(57) ABSTRACT

Methods, systems, and devices for wireless communication are described. A wireless device may establish a configuration for at least one carrier based on multiple transmission time interval (TTI) lengths. Several TTI lengths may be associated in a TTI group, and aspects of the configuration may be the same for all TTIs having a TTI length in the TTI group. The device may then communicate using the carrier configuration based on the TTI group. In some cases, a second TTI group with different TTI lengths from the first group may also be identified, and the device may communicate using TTI from the second group using a different TTI group configuration. Aspects of a TTI group configuration may include a common control channel format, resource allocation granularity, hybrid automatic repeat request (Continued)

(HARQ) process, HARQ timing, soft buffer size, channel state information (CSI) reporting configuration, or an uplink control channel.

27 Claims, 15 Drawing Sheets

(56) References Cited

U.S. PATENT DOCUMENTS

| | | | |
|---|---|---|---|
| 2009/0268695 A1* | 10/2009 | Zhao | H04L 5/0048 370/336 |
| 2010/0192035 A1* | 7/2010 | Sagfors | H04L 1/1819 714/748 |
| 2013/0242824 A1* | 9/2013 | Lee | H04L 1/1819 370/281 |
| 2013/0250924 A1* | 9/2013 | Chen | H04L 1/1819 370/336 |
| 2014/0071954 A1* | 3/2014 | Au | H04W 72/0446 370/336 |
| 2014/0362832 A1* | 12/2014 | Rudolf | H04L 1/1822 370/336 |
| 2015/0103749 A1* | 4/2015 | Kela | H04L 5/0055 370/329 |
| 2015/0117352 A1* | 4/2015 | Nammi | H04L 12/00 370/329 |
| 2016/0028513 A1* | 1/2016 | Werner | H04L 5/0007 370/330 |
| 2016/0164643 A1* | 6/2016 | Loehr | H04L 1/1854 370/336 |
| 2016/0249329 A1* | 8/2016 | Au | H04W 48/00 |

FOREIGN PATENT DOCUMENTS

| | | |
|---|---|---|
| EP | 2836044 A1 | 2/2015 |
| JP | 2008535392 A | 8/2008 |
| JP | 2009527187 A | 7/2009 |
| WO | WO-2006105005 A2 | 10/2006 |
| WO | WO-2007130011 A1 | 11/2007 |
| WO | WO-2010051505 | 5/2010 |
| WO | WO-2014040531 A1 | 3/2014 |
| WO | WO-2015018680 A1 | 2/2015 |

OTHER PUBLICATIONS

ISA/EP, International Search Report and Written Opinion of the International Searching Authority, Int'l Appl. No. PCT/US2016/022510, Jun. 22, 2016, European Patent Office, Rijswijk, NL, 13 pgs.

Mitsubishi Electric, "Uplink Reference Signal Design Based on TTI Grouping," 3GPP RAN1#45, Shanghai, R1-061153, May 8-12, 2006, 8 pgs., 3rd Generation Partnership Project.

\* cited by examiner

MANAGEMENT OF DYNAMIC TRANSMISSION TIME INTERVAL SCHEDULING FOR LOW LATENCY COMMUNICATIONS

CROSS REFERENCES

The present application for patent claims priority to U.S. Provisional Patent Application No. 62/140,667, entitled "Management Of Dynamic TTI Scheduling For ULL," filed Mar. 31, 2015, and assigned to the assignee hereof.

BACKGROUND

The following relates generally to wireless communication, and more specifically to management of dynamic transmission time interval (TTI) scheduling for low latency communications, including communications that may be referred to as ultra-low latency (ULL) communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

In some cases, a wireless network may utilize TTIs of relatively short duration in addition to TTIs of a longer duration for communications between base stations and UEs. This may enable reduced latency communications between devices. However, using multiple TTIs may also increase the complexity of the communication link, which may involve increased computational intensity or power consumption.

SUMMARY

A base station and a user equipment (UE) may establish a carrier configuration for at least one carrier based on multiple transmission time interval (TTI) lengths. Two or more of the TTI lengths may be associated in a TTI group, and aspects of the TTI group configuration may be the same for all TTIs having a TTI length in the group. The devices may communicate using the carrier configuration based on the TTI group. A second TTI group with different TTI lengths from the first TTI group may also be identified, and the devices may communicate using TTIs from the second TTI group. In some cases, communication using the TTIs and the associated TTI group configurations of the two TTI groups may be carried out simultaneously. In other cases, the devices may transition from one TTI group configuration to another. Aspects of the TTI group configuration may include a common control channel format, resource allocation granularity, hybrid automatic repeat request (HARQ) process, HARQ timing, soft buffer size, channel state information (CSI) reporting configuration, or uplink control channel.

A method of wireless communication is described. The method may include identifying a carrier configuration that includes a plurality of TTI lengths, identifying a TTI group including two or more TTI lengths from the plurality of TTI lengths, and communicating using the carrier configuration based at least in part on the identified TTI group.

An apparatus for wireless communication is described. The apparatus may include means for identifying a carrier configuration that includes a plurality of TTI lengths, means for identifying a TTI group including two or more TTI lengths from the plurality of TTI lengths, and means for communicating using the carrier configuration based at least in part on the identified TTI group.

A further apparatus for wireless communication is described. The apparatus may include a processor, memory in electronic communication with the processor, and instructions stored in the memory and operable, when executed by the processor, to cause the apparatus to identify a carrier configuration that includes a plurality of TTI lengths, identify a TTI group including two or more TTI lengths from the plurality of TTI lengths, and communicate using the carrier configuration based at least in part on the identified TTI group.

A non-transitory computer-readable medium storing code for wireless communication is described. The code may include instructions executable to identify a carrier configuration than includes a plurality of TTI lengths, identify a TTI group including two or more TTI lengths from the plurality of TTI lengths, and communicate using the carrier configuration based at least in part on the identified TTI group.

Some examples of the method, apparatuses, or non-transitory computer-readable medium may include steps, features, means, or instructions for identifying a second TTI group including one or more TTI lengths from the plurality of TTI lengths, wherein TTI lengths of each TTI group are different. Some examples may further include steps, means, features, or instructions for communicating using the carrier configuration and based on the second TTI group.

In some examples of the method, apparatuses, or non-transitory computer-readable medium, the plurality of TTI lengths may include at least one of a one symbol TTI length, a two symbol TTI length, a slot TTI length, or a subframe TTI length, or any combination thereof.

In some examples of the method, apparatuses, or non-transitory computer-readable medium, communicating using the carrier configuration may include steps, features, means, or instructions for communicating using a same control channel format for each TTI length in the TTI group. In some examples the control channel format may include a field indicating a TTI length of a scheduled communication, and the TTI length of the scheduled communication may be selected from the TTI group.

Some examples of the method, apparatuses, or non-transitory computer-readable medium may include steps, features, means, or instructions for communicating for a transport block using a first hybrid automatic repeat request (HARQ) transmission based on a TTI length in the TTI group, and communicating for the transport block using a second HARQ transmission based on a second TTI length, different from the first TTI length, in the TTI group.

Some examples of the method, apparatuses, or non-transitory computer-readable medium may include steps, features, means, or instructions for communicating an indication of a TTI group capability, and identifying the TTI group based on the indication of the TTI group capability.

Some examples of the method, apparatuses, or non-transitory computer-readable medium may include steps, features, means, or instructions for identifying a TTI length of a scheduled communication based on the TTI group and a rank of the scheduled communication.

In some examples of the method, apparatuses, or non-transitory computer-readable medium, identifying the carrier configuration may include steps, features, means, or instructions for at least one of identifying a shared resource allocation granularity for the TTI group, identifying a shared hybrid automatic repeat request (HARQ) process for the TTI group, or identifying a shared HARQ timing based at least in part on the TTI group, or any combination thereof.

In some examples of the method, apparatuses, or non-transitory computer-readable medium, the carrier configuration may include a shared soft buffer for the TTI group. In some examples a size of the shared soft buffer is based on a longest TTI length in the TTI group.

In some examples the carrier configuration may include a shared channel state information (CSI) reporting configuration for the TTI group. In some examples the shared CSI reporting configuration may be based on a shortest TTI length in the TTI group.

In some examples of the method, apparatuses, or non-transitory computer-readable medium, at least one TTI length in the TTI group may be associated with a limited number of initial symbol periods.

Some examples of the method, apparatuses, or non-transitory computer-readable medium may include steps, features, means, or instructions for mapping each code block in a transport block to a first symbol of a TTI based on a TTI length from the TTI group, wherein the TTI length is greater than one symbol period.

In some examples of the method, apparatuses, or non-transitory computer-readable medium, the TTI group is based on a user equipment (UE) capability, and the UE capability may be based on a low latency operation.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

Aspects of the disclosure are described in reference to the following figures.

DETAILED DESCRIPTION

A base station and a user equipment (UE) may establish a configuration for at least one carrier based on multiple transmission time interval (TTI) lengths. Two or more of the TTI lengths may be associated in a TTI group, and aspects of the configuration may be the same for all TTIs having a TTI length in the group. The devices may then communicate using the carrier configuration based on the TTI group.

Aspects of the disclosure are initially described in the context of a wireless communication system. Specific examples are then described illustrating different examples of TTI lengths that may be grouped. These and other aspects of the disclosure are further illustrated by and described with reference to apparatus diagrams, system diagrams, and flowcharts that relate to management of dynamic TTI scheduling for low latency operation, such as ultra-low latency (ULL) operation.

Figure 1:
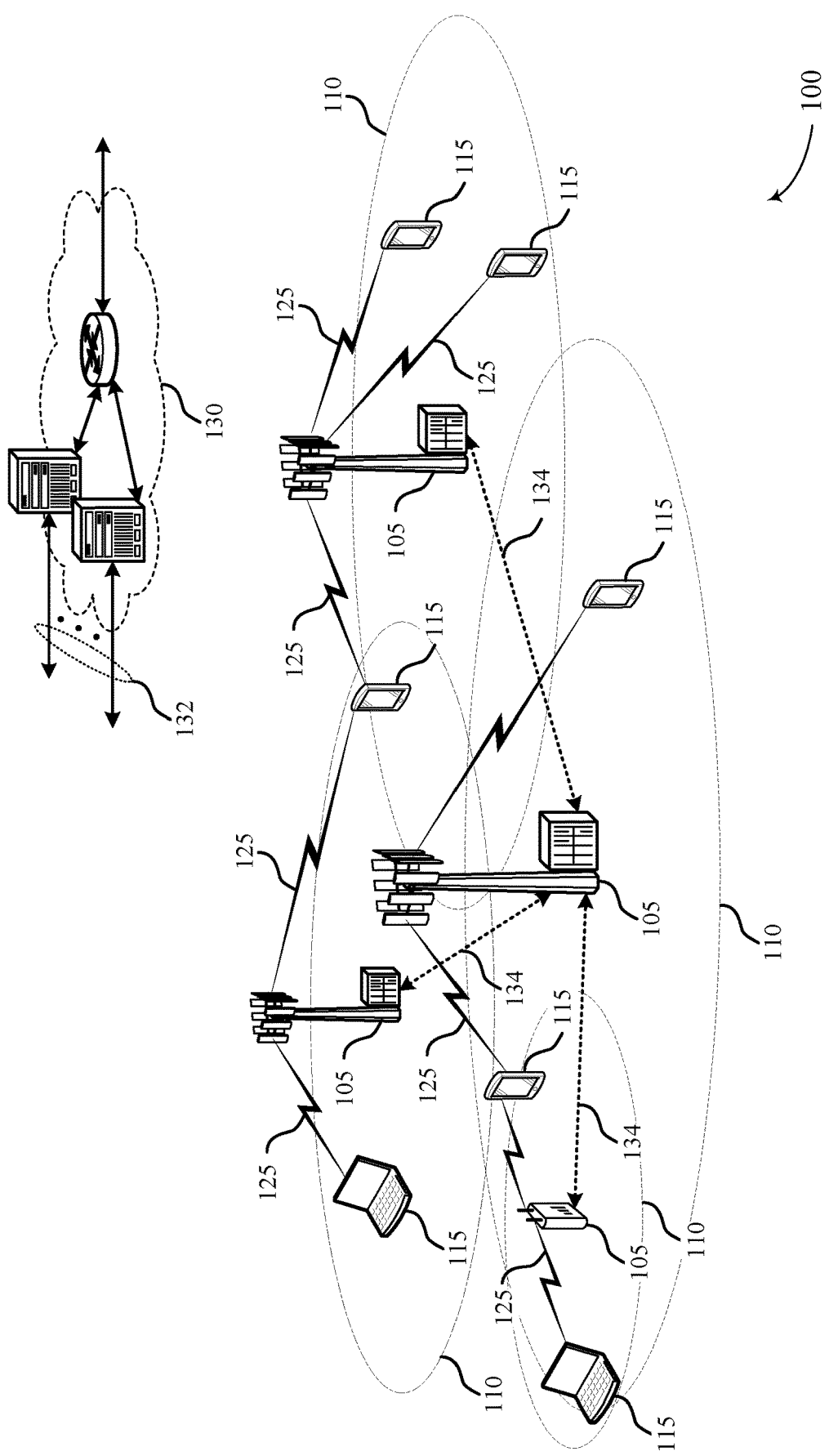
FIG. 1 illustrates an example of a wireless communications system that supports management of dynamic transmission time interval (TTI) scheduling for low latency operation in accordance with various aspects of the present disclosure.

FIG. 1 illustrates an example of a wireless communications system 100 that supports management of dynamic TTI scheduling for low latency operation in accordance with various aspects of the present disclosure. The wireless communications system 100 includes base stations 105, UEs 115, and a core network 130. In some examples, the wireless communications system 100 may be a Long Term Evolution (LTE)/LTE-advanced (LTE-a) network.

The base stations 105 may wirelessly communicate with the UEs 115 via one or more base station antennas. Each of the base stations 105 may provide communication coverage for a respective geographic coverage area 110. The communication links 125 shown in wireless communications system 100 may include uplink (UL) transmissions from a UE 115 to a base station 105, or downlink (DL) transmissions, from a base station 105 to a UE 115.

The UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like. The UEs 115 may communicate with base stations 105, and may support dynamic coverage enhancement (CE).

The base stations 105 may support, and may communicate with the core network 130 and with one another to provide dynamic CE information in order to support low cost paging. For example, the base stations 105 may interface with the core network 130 through backhaul links 132 (e.g., S1, etc.). The base stations 105 may also communicate with one another over backhaul links 134 (e.g., X2, etc.) either directly or indirectly (e.g., through core network 130). The base stations 105 may perform radio configuration and scheduling for communication with the UEs 115, or may operate under the control of a base station controller (not shown). In various examples, base stations 105 may be macro cells, small cells, hot spots, or the like. The base stations 105 may also be referred to as eNodeBs (eNBs) 105 in some examples.

A communication link 125 may include one or more frequency ranges organized into carriers. A carrier may also be referred to as a component carrier (CC), a layer, a channel, etc. The term "component carrier" may refer to each carrier of a set of multiple carriers utilized by a UE in carrier aggregation (CA) operation, and may be distinct from other portions of system bandwidth. For instance, a component carrier may be a relatively narrow-bandwidth carrier capable of being utilized independently or in combination with other component carriers. Each component carrier may provide the same capabilities as an isolated carrier based on release 8 or release 9 of the LTE standard, for example. Multiple component carriers may be aggregated or utilized concurrently to provide some UEs 115 with greater bandwidth and, e.g., higher data rates. Thus, individual component carriers may be backwards compatible with legacy UEs 115 (e.g., UEs 115 implementing LTE release 8 or release 9); while other UEs 115 (e.g., UEs 115 implementing post-release 8/9 LTE versions), may be configured with multiple component carriers in a multi-carrier mode. A carrier used for DL may be referred to as a DL CC, and a carrier used for UL may be referred to as an UL CC. A UE 115 may be configured with multiple DL CCs and one or more UL CCs for carrier aggregation. Each carrier may be used to transmit control information (e.g., reference signals, control channels, etc.), overhead information, data, etc. Some wireless systems may be limited to a five component carriers per UE 115. However, in some systems, such as a system utilizing enhanced CA (eCA) operations, an increased number of carriers may be used (e.g., up to 32 CCs, more than 32 CCs, etc.).

In some cases, a CC may have a limited frequency range, including a limitation of up to 20 MHz according to some communications protocols. Different CCs may utilize different combinations of frequency division duplexing (FDD) and time division duplexing (TDD). In some cases, a UE 115 may be served by cells from two or more base stations 105 that are connected by a non-ideal backhaul link 134 in dual connectivity operation. For example, the connection between the serving base stations 105 may be insufficient to support a threshold level of timing coordination. Thus, in some cases, the cells serving a UE 115 may be divided into multiple timing adjustment groups (TAGs). Each of the TAGs may be associated with a different timing offset, such that the UE 115 may synchronize UL transmissions differently for different UL carriers.

A UE 115 may communicate with a single base station 105 utilizing multiple carriers, and may also communicate with multiple base stations simultaneously on different carriers. Each cell of a base station 105 may include an UL component carrier (CC) and a DL CC. The geographic coverage area 110 of each serving cell for a base station 105 may be different (e.g., CCs on different frequency bands may experience different path loss). In some examples, one carrier is designated as the primary carrier, or primary component carrier (PCC), for a UE 115, which may be served by a primary cell (PCell). Primary cells may be semi-statically configured by higher layers (e.g., radio resource control (RRC), etc.) on a per-UE basis. Certain uplink control information (UCI), such as a physical uplink control channel (PUCCH), may be carried by the primary cell. Additional carriers may be designated as secondary carriers, or secondary component carriers (SCC), which may be served by secondary cells (SCells). Secondary cells may likewise be semi-statically configured on a per-UE basis. In some cases, secondary cells may not include or be configured to transmit the same control information as the primary cell. In some cases, one or more SCells may be designated to carry PUCCH, and other SCells may be organized into PUCCH groups based on which CC is used to carry the associated UL control information.

In some cases, a wireless communications system may utilize one or more enhanced component carriers (eCCs). An eCC may be characterized by one or more features including flexible bandwidth, variable length TTIs, and modified control channel configuration. In some cases, an eCC may be associated with a carrier aggregation configuration or a dual connectivity configuration (e.g., when multiple serving cells have a suboptimal backhaul link). An eCC may also be configured for use in unlicensed spectrum and/or shared spectrum (e.g., where more than one operator is licensed to use the spectrum, etc.). An eCC characterized by flexible bandwidth may include one or more segments that may be utilized by UEs 115 that do not, or are not capable of monitoring the whole bandwidth, or prefer to use a limited bandwidth (e.g., to conserve power).

An eCC may utilize a variable TTI length, which may include use of a reduced or variable symbol duration. In some cases the symbol duration may remain the same, but each symbol may represent a distinct TTI. In some cases an eCC may include multiple hierarchical layers associated with the different TTI lengths. For example, TTIs at one hierarchical layer may correspond to uniform 1 ms subframes, whereas in a second layer, variable length TTIs may correspond to bursts of short duration symbol periods. In some cases, a shorter symbol duration may also be associated with increased subcarrier spacing. According to the present disclosure, when multiple TTI lengths used they may be arranged in TTI groups sharing common configuration aspects to reduce the complexity of communicating using different TTIs.

TTIs may be defined based on a basic time unit (e.g., a sampling period, $T_s=1/30,720,000$ seconds), and organized according to 10 ms radio frames ($T_f=307200 \cdot T_s$). Each frame may be identified by a system frame number (SFN)

ranging from 0 to 1023. Each frame may include ten 1 ms subframes numbered from 0 to 9. However, a subframe may be further divided into two 0.5 ms slots, each of which contains 6 or 7 modulation symbol periods (e.g., depending on the length of a cyclic prefix prepended to each symbol). Excluding a cyclic prefix, each symbol may include 2048 sample periods. In some cases the subframe may be the smallest scheduling unit, which may be referred to as a TTI. In other cases, a TTI may be shorter than a subframe or may be dynamically selected (e.g., in short TTI bursts or in selected component carriers using short TTIs). For example, TTIs may be set according to a slot or one or more symbol periods.

Flexible bandwidth and variable TTIs may be associated with a modified control channel configuration (e.g., an eCC may utilize an enhanced physical downlink control channel (ePDCCH) for DL control information). For example, one or more control channels of an eCC may utilize frequency division multiplexing (FDM) scheduling to accommodate flexible bandwidth use. Other control channel modifications may include the use of additional control channels (e.g., for evolved multimedia broadcast multicast service (eMBMS) scheduling, or to indicate the length of variable length UL and DL bursts), or control channels transmitted at different intervals. An eCC may also include modified or additional hybrid automatic repeat request (HARQ) related control information.

HARQ may be a method of determining whether data is received correctly over a communication link 125 and may be one aspect of a communication configuration that may be simplified for a carrier utilizing multiple TTIs. HARQ may include a combination of error detection (e.g., using a cyclic redundancy check (CRC)), forward error correction (FEC), and retransmission (e.g., automatic repeat request (ARQ)). HARQ may improve throughput at a media access control (MAC) layer in poor radio conditions (e.g., signal-to-noise conditions). In Incremental Redundancy HARQ, incorrectly received data may be stored in a soft buffer and combined with subsequent transmissions to improve the overall likelihood of successfully decoding the data. In some cases, redundancy bits may be added to each message prior to transmission. This may be beneficial in a wireless communications environment having poor signal propagation conditions. In other cases, redundancy bits are not added to each transmission, but are retransmitted after the transmitter of the original message receives a negative acknowledgement (NACK) indicating a failed attempt to decode the information. The chain of transmission, response, and retransmission may be referred to as a HARQ process. In some cases, the number of HARQ processes may be limited (e.g., to eight). A carrier using grouped TTIs may utilize the same HARQ process, HARQ timing, or soft buffer size for TTIs associated with the group.

Another aspect of a communication link that may be simplified for carriers using multiple TTIs is a physical downlink control channel (PDCCH). PDCCH may carry downlink control information (DCI) in control channel elements (CCEs), which may consist of nine logically contiguous resource element groups (REGs), where each of the REGs contains 4 resource elements (REs). DCI may include information regarding DL scheduling assignments, UL resource grants, transmission scheme, UL power control, HARQ information, modulation and coding scheme (MCS), and other information. The size and format of the DCI messages can differ depending on the type and amount of information that is carried by the DCI. For example, if spatial multiplexing is supported, the size of the DCI message may be large compared to contiguous frequency allocations. Similarly, for a system that employs MIMO, the DCI may include additional signaling information. DCI size and format may depend on the amount of information as well as factors such as bandwidth, the number of antenna ports, and duplexing mode. In some examples the DCI format may be the same for each TTI associated with a TTI group.

In some cases, PDCCH can carry DCI messages associated with multiple users, and each UE 115 may decode the DCI messages that are intended for the UE 115. For example, each UE 115 may be assigned a cell radio network temporary identity (C-RNTI) and CRC bits attached to each DCI may be scrambled based on the C-RNTI. To reduce power consumption and overhead at various UEs 115, a limited set of control channel element (CCE) locations can be specified for DCI associated with a specific UE 115. CCEs may be grouped (e.g., in groups of 1, 2, 4 and 8 CCEs), and a set of CCE locations in which the user equipment may find relevant DCI may be specified. These CCEs may be known as a search space. In some examples the search space can be partitioned into two regions: a common CCE region or search space and a UE-specific (dedicated) CCE region or search space. The common CCE region may be monitored by all UEs served by a base station 105 and may include information such as paging information, system information, random access procedures and the like. The UE-specific search space may include user-specific control information. CCEs may be indexed, and the common search space may start from CCE 0. The starting index for a UE specific search space may depend on the C-RNTI, the subframe index, the CCE aggregation level and a random seed. A UE 115 may attempt to decode DCI by performing a process known as a blind decode, during which search spaces are randomly decoded until the DCI is detected. During a blind decode, the UE 115 may attempt descramble all potential DCI messages using its C-RNTI, and perform a CRC check to determine whether the attempt was successful.

A PDCCH transmission for a UE 115 may indicate resources for a scheduled data transmission based on a resource allocation granularity. That is, resources available in a physical downlink shared channel (PUSCH) may be grouped into units of a certain size and indexed so the PDCCH can schedule a set of resources using the associated index. A preconfigured resource allocation granularity may be configured for multiple TTI lengths to reduce the complexity of interpreting a scheduling assignment, or to reduce the amount of signaling used to convey the assignment.

On the uplink, a physical uplink control channel (PUCCH) may be used for UL acknowledgements (ACKs), scheduling requests (SRs), channel quality indicators (CQI) and other UL control information. A PUCCH transmission may be mapped to a control channel defined by a code and two consecutive resource blocks. UL control signaling may depend on the presence of timing synchronization for a cell. PUCCH resources for SR and CQI reporting may be assigned (and revoked) through RRC signaling. In some cases, resources for SR may be assigned after acquiring synchronization through a random access channel (RACH) procedure. In other cases, an SR may not be assigned to a UE 115 through the RACH (i.e., synchronized UEs may or may not have a dedicated SR channel). PUCCH resources for SR and CQI may be lost when the UE is no longer synchronized. In some cases, a combined PUCCH may be used for TTIs associated with a group of TTI lengths.

Another aspect of a communication link that may be simplified for carriers using multiple TTIs is a channel state information (CSI) reporting configuration. In some examples a base station 105 may gather channel condition information from a UE 115 in order to efficiently configure schedule the channel. This information may be sent from the UE 115 in the form of a channel state report. A channel state report may contain a rank indicator (RI) requesting a number of layers to be used for DL transmissions (e.g., based on the antenna ports of the UE 115), a precoding matrix indicator (PMI) indicating a preference for which precoder matrix should be used (e.g., based on the number of layers), and a channel quality indicator (CQI) representing the highest MCS that may be used. CQI may be calculated by a UE 115 after receiving predetermined pilot symbols such as cell-specific reference signals (CRS) or channel state information reference signals (CSI-RS). RI and PMI may be excluded if the UE 115 does not support spatial multiplexing (or is not in support spatial mode). The types of information included in the report may determine aspects of a reporting type. Channel state reports may be periodic or aperiodic. That is, a base station 105 may configure a UE 115 to send periodic reports at regular intervals, and may also request additional reports as needed. Aperiodic reports may include wideband reports indicating the channel quality across an entire cell bandwidth, UE selected reports indicating a subset of the best subbands, or configured reports in which the subbands reported are selected by the base station 105.

Thus, a base station 105 and a UE 115 may establish a carrier configuration for at least one carrier based on multiple TTI lengths. Two or more of the TTI lengths may be associated in a TTI group, and aspects of the carrier configuration may be the same for all TTIs having a TTI length in the group. The devices may then communicate using the carrier configuration based on the TTI group. Aspects of the configuration based on the TTI group (e.g., a TTI group configuration) may include a common control channel format, resource allocation granularity, HARQ process, HARQ timing, soft buffer size, CSI reporting configuration, or uplink control channel.

Figure 2:
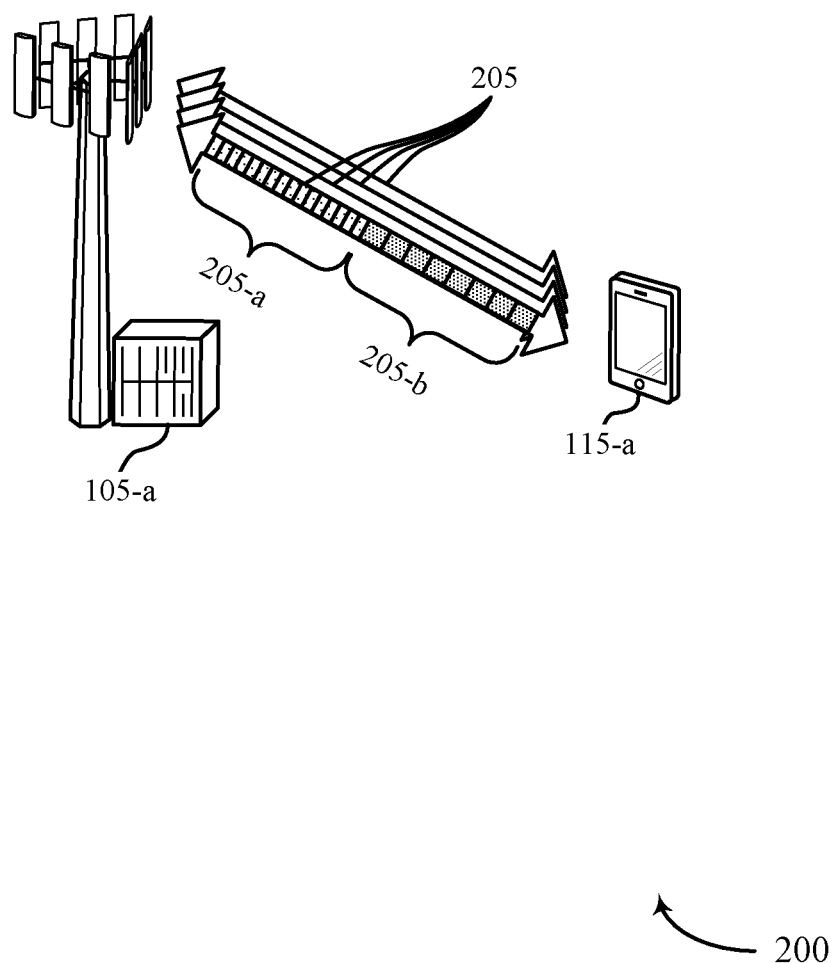
FIG. 2 illustrates an example of a wireless communications system that supports management of dynamic TTI scheduling for low latency operation in accordance with various aspects of the present disclosure.

FIG. 2 illustrates an example of a wireless communications system 200 that supports management of dynamic TTI scheduling for low latency operation in accordance with various aspects of the present disclosure. Wireless communications system 200 represents an example in which UE 115-a communicates with base station 105-a using at least one carrier with more than one TTI length 205. The TTI lengths 205 may be grouped in a TTI group, and aspects of the carrier configuration may be simplified based on the grouping. UE 115-a and base station 105-a may be examples of a UE 115 and base station 105 described with reference to FIG. 1.

UE 115-a and base station 105-a may utilize one or more TTI lengths, such as one or more TTI lengths of less than a subframe. This may facilitate a reduction in latency, and may involve procedures referred to as ULL operations, low latency operations, or reduced latency operations in various examples. For example, according to some LTE communications protocols, ULL operations may result in approximately 300 μs HARQ latency, compared with 4 ms in non-ULL operations. In some cases, ULL and non-ULL operations may coexist in the same carrier, e.g., via resource block level multiplexing. The latency reduction for low latency operations may depend on the length of the TTI being used. For example, using a 1-symbol period TTI with a normal cyclic prefix (CP) (~71 μs) may result in a 14 times latency reduction, whereas a 1 symbol period TTI with an extended CP (~83 μs) may result in 12 times latency reduction.

Other TTI lengths can be considered in addition to 1-symbol based TTIs. For example, TTI lengths may include 1 slot length (0.5 ms) or 2 symbol periods. UE 115-a may be configured to monitor a carrier based on the different TTI lengths. The configuration may be dynamic (i.e., based on regular signaling) or semi-static. The number of TTI lengths that UE 115-a is configured to monitor may be based on a combination of operational efficiency, latency reduction, and coverage range. The configuration may include a control channel design, resource allocation, procedures for colliding communications (e.g., transmissions or receptions), HARQ feedback and management, starting symbols for multi-symbol TTIs, and CSI feedback.

In some cases, multi-TTI operations may be managed on a per group basis to achieve a desired trade-off between complexity and flexibility. For example, each group may include one or more TTI lengths. In some cases, the TTI length groups may include similar TTI lengths, but they may be changed dynamically based on channel and traffic conditions.

In some cases, UE 115-a may be semi-statically configured with one TTI group from a plurality of TTI groups, but base station 105-a may support other TTI groups used by other UEs 115 (or by UE 115-a on different carriers). One example of a TTI length grouping may be to group 1-symbol and 2-symbol TTIs together, and to group 1-slot and 1-subframe TTIs together. Within each TTI group, the associated TTIs may share many, if not all, of the physical and media access control (MAC) layer operations. Across TTI groups, different physical and MAC layer operations may be applied.

For example, the same control channel can be used by the TTIs in a TTI group, and a field in the control channel message may be used to dynamically indicate which TTI in the TTI group is being scheduled. For example, for a TTI group with 1-symbol TTIs and 2-symbol TTIs, a 1-bit field in the DL grant or UL grant may be used indicate whether a 1-symbol TTI or a 2-symbol TTI transmission is being scheduled. In other cases implicit indication may be used. For example, the TTI length may be associated with the scheduled rank for DM-RS based ULL PDSCH (uPDSCH). That is, for rank 1 and rank 2, 1-symbol TTI may be used; for rank 3 and above, 2-symbol TTI may be used.

A same resource allocation granularity may also be used for one or more TTIs in the same TTI group. For example, for a TTI group with 1-symbol TTIs and 2-symbol TTIs, a 25-resource block based block assignment may be used for both TTIs. Alternatively, different resource allocation granularity may be used for different TTIs of the same TTI group.

In asynchronous HARQ operations, a same HARQ process may be used for one or more TTIs in the same TTI group. For example, for a TTI group with 1-symbol TTIs and 2-symbol TTIs (in which a total of eight HARQ processes may be defined), a new transmission started with a 1-symbol TTI may be re-transmitted with a 2-symbol TTI. Similarly, a new transmission started with a 2-symbol TTI may be re-transmitted with a 1-symbol TTI. This may be beneficial when the 2-symbol TTI starts with a transmission of 2 transport blocks. If one transport block is successfully transmitted but the other fails, the re-transmission of the failed transport block can be accomplished using a 1-symbol TTI.

A common soft buffer may also be used for one or more TTIs of a TTI group. In some cases, the soft buffer size may be determined based on the a longest TTI length within the TTI group. A common CSI configuration may also be used for TTIs of a TTI group. For example, the CSI measurement periodicity may be based on a shortest TTI length in the TTI group. CSI reporting may further indicate a channel quality indicator (CQI) delta of other TTI length(s) of the same TTI group, where the CQI of all TTIs in the same TTI group can be subject to a same rank indicator (RI), precoding matrix indicator (PMI), or precoding type indicator (PTI).

In some cases, the starting symbol for one or more TTIs in the TTI group may be based on the TTI group configuration. For a TTI length of more than 1 symbol, the possible starting symbols associated with a TTI may be limited. For example, for a 2-symbol TTI, starting symbols may be limited to 1/3/5 (i.e., avoiding starting symbols 0/2/4/6) in a slot in normal CP, or 0/2/4 (i.e., avoiding starting symbols 1/3/5) in a slot in extended CP. Alternatively, some communications may omit the 2-symbol TTI in the first slot for normal CP, while the remaining 12 symbols in the subframe can be arranged to have 6 possible 2-symbol-TTI based on transmission opportunities. For a 4-symbol TTI, starting symbols may be limited to 1/5 in the first slot and symbol 2 in the second slot in normal CP, or 0/4 in the first slot and symbol 2 in the second slot in extended CP.

In some cases, preemption procedures are used for low latency operations. For example, a transmission based on a 1 subframe TTI may be interrupted based on a subsequently scheduled 1 symbol period transmission. In some cases, preemption procedures may be restricted within TTI groups. That is, if there is an ongoing first transmission of a first TTI, and base station 105-a decides to schedule a second transmission of a second TTI, it is may be configured such that the scheduled second transmission does not overlap in time within the first transmission (e.g., immediately after the first transmission). Within a TTI group, the TTIs may be of similar durations and the benefits of prioritization of the second transmission over the first transmission may be limited in terms of latency reduction compared to circumstances where TTIs are used with greater differences in length.

However, in some cases two transmissions of different TTIs of the same TTI group may still occur in a same symbol period, especially when the two transmissions do not have overlapped resources. Thus, mapping of data transmissions (DL or UL) may be done in a manner that may mitigate the impact of overlapping transmissions. In some examples, for a given TTI greater than 1 symbol, all code blocks of all transport blocks of the transmission may be mapped in a single symbol period (e.g., frequency first mapping); additional symbols may provide more redundancy for the transmission.

As a result, if preemption occurs, base station 105-a may choose to replace a symbol of a transmission employing a TTI greater than 1 symbol with another transmission employing another TTI that will have less impact. For example, base station 105-a may decide to schedule a 1-symbol TTI transmission in the second symbol of an ongoing 2-symbol TTI transmission. With the above resource mapping, the 2-symbol TTI transmission may have an increased coding rate due to the preemption, while all code blocks and transport blocks may still have an opportunity to be transmitted.

Within a TTI group, a same HARQ timing and channel may be used (instead of using separate HARQ timing and channels for different TTIs in the TTI group). In some cases, the timeline may be based on the longest TTI length in the TTI group. For example, for a TTI group of 1-symbol and 2-symbol TTI DL transmissions, a 2-symbol uPUCCH may be shared for 1-symbol or 2-symbol TTI transmissions in the TTI group. The HARQ timing line can be defined such that transmissions in symbols n and n+1 may be mapped to a uPUCCH in symbols n+5 and n+6 (based on the last symbol n+1, with a 4-symbol gap). The next earliest transmission opportunity may then be at symbol n+10. This may result in a 10-symbol round trip time (RTT), or 710 us. A 3-symbol gap for the next earliest opportunity may enable a retransmission in symbol n+9.

In some cases, a 1-symbol transmission may be mapped to one symbol of the two-symbol uPUCCH, or both symbols of the 2-symbol uPUCCH. In one case, a 1-symbol TTI transmission in symbol n may be mapped to symbol n+5 of uPUCCH, while 1-symbol TTI transmission in symbol n+1 may be mapped to symbol n+6 of uPUCCH. As another alternative, a 1-symbol TTI transmission in symbol n or n+1 may be mapped to uPUCCH of both symbols n+5 and n+6. The mapping alternatives can be UE-specific (e.g., UE 115-a may follow the first alternative while a neighboring UE 115 may follow the second alternative). In other cases, the configuration may be predefined (e.g., if base station 105-a supports a single alternative). Note that a 2-symbol TTI based uPDSCH may always be mappable to 2-symbol PUCCH. With the first alternative, base station 105-a may can pick a 1-symbol ULL PDSCH (uPDSCH) or a 2-symbol uPDSCH, which may be mapped to 1-symbol uPUCCH or 2-symbol uPUCCH respectively, thereby dynamically targeting different coverage areas for uPUCCH.

Resources for uPDCCH for a transmission may be semi-statically or dynamically determined. This may avoid PUCCH collisions among transmissions of different TTIs (e.g., 1-symbol vs. 2-symbol TTI) or same TTI transmissions in different symbols (1-symbol TTI in symbol n and n+1, but both require 2-symbol uPUCCH). This can be done by, for example, specifying a different resource offset for each TTI or for same TTI in different symbols.

While these and other aspects of the carrier configuration may be the same for each TTI associated with the TTI group, across TTI groups the control channels, resource allocation granularity, soft buffer, PUCCH, CSI reporting, etc. can be different. For example, group-based CSI reporting, and soft buffer management may be used. Cross-group preemption may also be utilized. For example, a 1-ms TTI transmission in one TTI group may be punctured by a 1-symbol TTI transmission in another TTI group.

In some cases, UE 115 may be configured with different operational capabilities. For example, a first capability may be reserved for 1-symbol TTI for reduced latency. This may be appropriate for conditions involving limited range and very low latency. Another capability may include a 1-symbol TTI for reduced latency or 1-slot TTI for reduced latency, semi-statically configured. Another capability may include a single group with 1-symbol or 2-symbol TTIs, and may be dynamically switched. Another capability may include a single group with 1-slot or. 1-ms TTI, dynamically switched. Yet another capability may include two groups: a first group with 1-symbol and 2-symbol TTIs, and second group with 1-slot and 1-ms TTIs. In some cases, UE 115-a may monitor 1-ms TTI at least for broadcast traffic and irrespective of the mode. Different capability may have different latency performance. For example, the first capability may be used with an 8-symbol HARQ RTT, while the 1 and 2 symbol period capability may be used for 10-symbol HARQ RTT. UE 115-a may indicate its capability or category based on whether it supports a single TTI, multi-TTI with semi-static configuration, or multi-TTI with dynamic TTI management.

Base station 105-*a* may then take into account the UE capability into its scheduling decisions.

Figure 3:
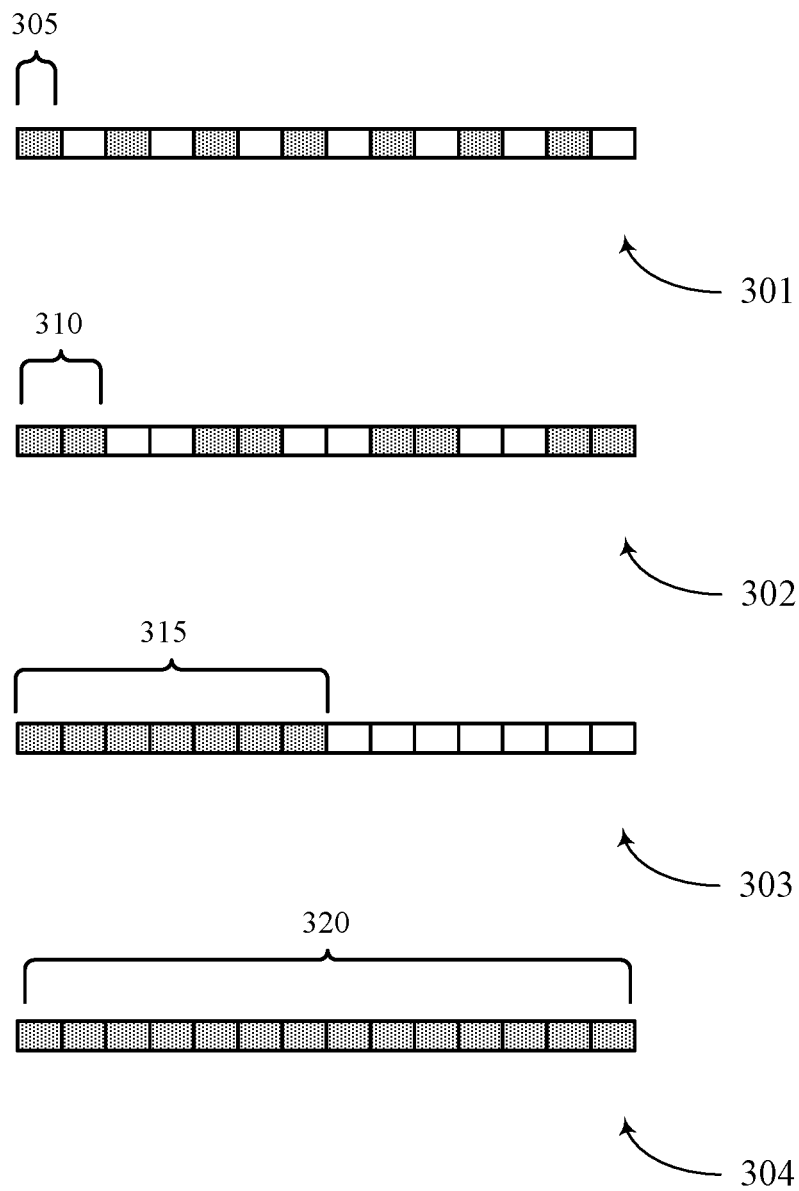
FIG. 3 illustrate examples of TTI length configurations that support management of dynamic TTI scheduling for low latency operation in accordance with various aspects of the present disclosure.

FIG. 3 illustrates examples of TTI length configurations 301-304 that support management of dynamic TTI scheduling for low latency operation in accordance with various aspects of the present disclosure. TTI length configurations 301-304 may be used by a UE 115 and a base station 105 as described with reference to FIGS. 1-2, and each may be represented by a series of time divisions (e.g. a number of symbol periods, a number of slots, a number of subframes, etc.) according to various communications protocols.

TTI length configuration 301 represents a TTI length of one symbol period 305. In some cases, TTI length configuration 301 may represent a shortest TTI length used by a wireless network, and may be used for low latency operations. However, in some examples an effective range may be limited when using TTI length configuration 301. For example, the relatively short duration of the TTI length configuration 301 may be limited with respect to coverage enhancement capabilities when compared to longer TTI length configurations.

TTI length configuration 302 may represent a TTI length based on a two symbol period duration 310. TTI length configuration 302 may also be used for low latency and limited range communications. However, the latency reduction may not be as great as for TTI length configuration 301, and the range may not be as limited. In some examples, TTI length configuration 301 and TTI length configuration 302 may be grouped in a TTI group, and may share common configuration aspects as described with reference to FIGS. 1 and 2.

TTI length configuration 303 may represent a TTI length based on one slot 315. TTI length configuration 303 may result in higher latency than TTI length configuration 301 and TTI length configuration 302, but may have a higher range. In some cases, TTI length configuration 302 and TTI length configuration 303 may be associated with limited starting symbols when group with other TTI lengths (not shown).

TTI length configuration 304 may represent a TTI length of one subframe 320. In some cases, TTI length configuration 304 may represent a default or non-ULL TTI length. In some cases, TTI length configuration 303 and TTI length configuration 304 may be grouped in a TTI group, and may share physical or MAC layer procedures as described with reference to FIGS. 1 and 2.

TTI length configurations 301-304 represent four examples of TTI lengths, but other lengths may also be used such as 3 symbol periods or 4 symbol periods. In some cases, groupings other than those described may also be used. For example, 1 symbol and 1 slot TTI lengths, 1 symbol and 1 subframe TTI lengths, 2 symbol and 1 slot TTI lengths, 2 symbol and 1 subframe TTI lengths, or 1 symbol, 2 symbol and 1 slot TTI lengths, 1 symbol, 1 slot and 1 subframe TTI lengths, 2 symbol, 1 slot and 1 subframe TTI lengths, or any other combination including combinations with 3 and 4 symbol periods and other TTI lengths not explicitly described herein.

Figure 4:
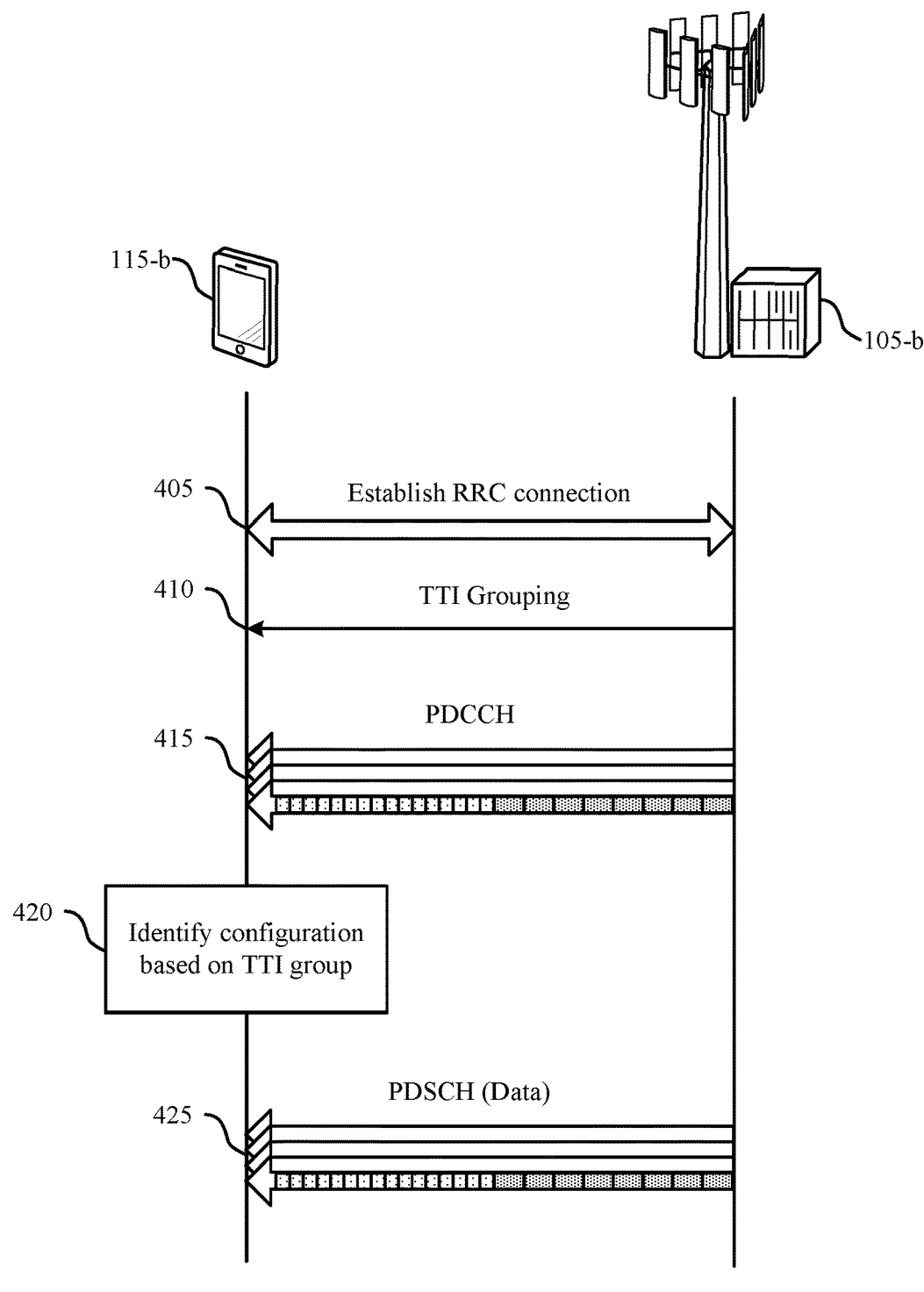
FIG. 4 illustrates an example of a process flow that supports management of dynamic TTI scheduling for low latency operation in accordance with various aspects of the present disclosure.

FIG. 4 illustrates an example of a process flow 400 that supports management of dynamic TTI scheduling for low latency communications in accordance with various aspects of the present disclosure. Process flow 400 may include steps performed by a UE 115-*b* and a base station 105-*b*, which may represent the corresponding devices described with reference to FIGS. 1 and 2.

At 405, UE 115-*b* and base station 105-*b* may establish an RRC configuration. For example, UE 115-*b* and base station 105-*b* may identify and establish a carrier configuration that includes a plurality of TTI lengths.

At 410, base station 105-*b* may indicate to UE 115-*b* a TTI grouping, including at least one TTI group designated for use by UE 115-*b*. Thus, both devices may identify a TTI group, which may include two or more TTI lengths from the plurality of TTI lengths. In some cases, base station 105-*b* and UE 115-*b* may identify a second TTI group that may include one or more TTI lengths from the plurality of TTI lengths. In some examples, the plurality of TTI lengths may include a one symbol period TTI length, a two symbol period TTI length, a slot TTI length, a subframe TTI length, or any combination thereof.

In some cases, UE 115-*b* may transmit, and base station 105-*b* may receive, an indication of a TTI group capability. Base station 105-*b* may identify the TTI group based on the UE capability. In some cases, UE 115-*b* may identify a TTI length for a scheduled transmission based on the TTI group and a rank of the scheduled transmission (i.e., the scheduled DM-RS rank). In some examples, the TTI group may be based at least in part on a UE capability, and the capability may be based on a low latency operation or mode.

At 415, base station 105-*b* may transmit a control message (e.g., on PDCCH) to UE 115-*b* over one or more carriers including at least one carrier utilizing multiple grouped TTI lengths.

At 420, UE 115-*b* may identify one or more configurations aspects based on an assigned TTI group. In some examples, communicating using the carrier configuration includes communicating using a same control channel format for each TTI length in the TTI group. In some examples, the control channel format includes a field indicating a TTI length from the TTI group, and the communication may be based on the TTI length.

In some cases, UE 115-*b* may identify a shared resource allocation granularity for the TTI group and interpret the control message based on the resource granularity. In some examples, the carrier configuration may include a shared HARQ process for the TTI group. In some examples, the carrier configuration may include a shared HARQ timing based on the TTI group. Additionally or alternatively, the carrier configuration may include a shared soft buffer for the TTI group. The shared soft buffer may have a size based on a longest TTI length in the TTI group. In some examples, the carrier configuration includes a shared CSI reporting configuration for the TTI group. The shared CSI reporting configuration may be based on a shortest TTI length in the TTI group. In some examples, one or several TTI lengths in the TTI group may be associated with a limited number of starting symbol periods.

At 425, UE 115-*b* may receive a data transmission (e.g., over PDSCH) from base station 105-*b* over one or more carriers based on the configuration associated with the TTI group. In some cases, the data transmission may be sent simultaneously with the control message and the data may be buffered until the control information is decoded. Thus, base station 105-*b* and UE 115-*b* may communicate using the carrier configuration based on the identified TTI group. In some cases, base station 105-*b* and UE 115-*b* may also communicate using the carrier configuration based on the second TTI group.

In some cases, base station 105-*b* and UE 115-*b* may communicate for a transport block using a first HARQ transmission based on a first TTI length in the TTI group. Base station 105-*b* and UE 115-*b* may then communicate for the transport block using a second HARQ transmission based on a second TTI length, different from the first TTI length, in the TTI group. Base station 105-*b* may map each code block in a transport block to a first symbol of a TTI based on a TTI length from the TTI group. In some cases, base station 105-*b* may map each code block in the transport to a second symbol of the TTI based on the TTI group.

Figure 5:
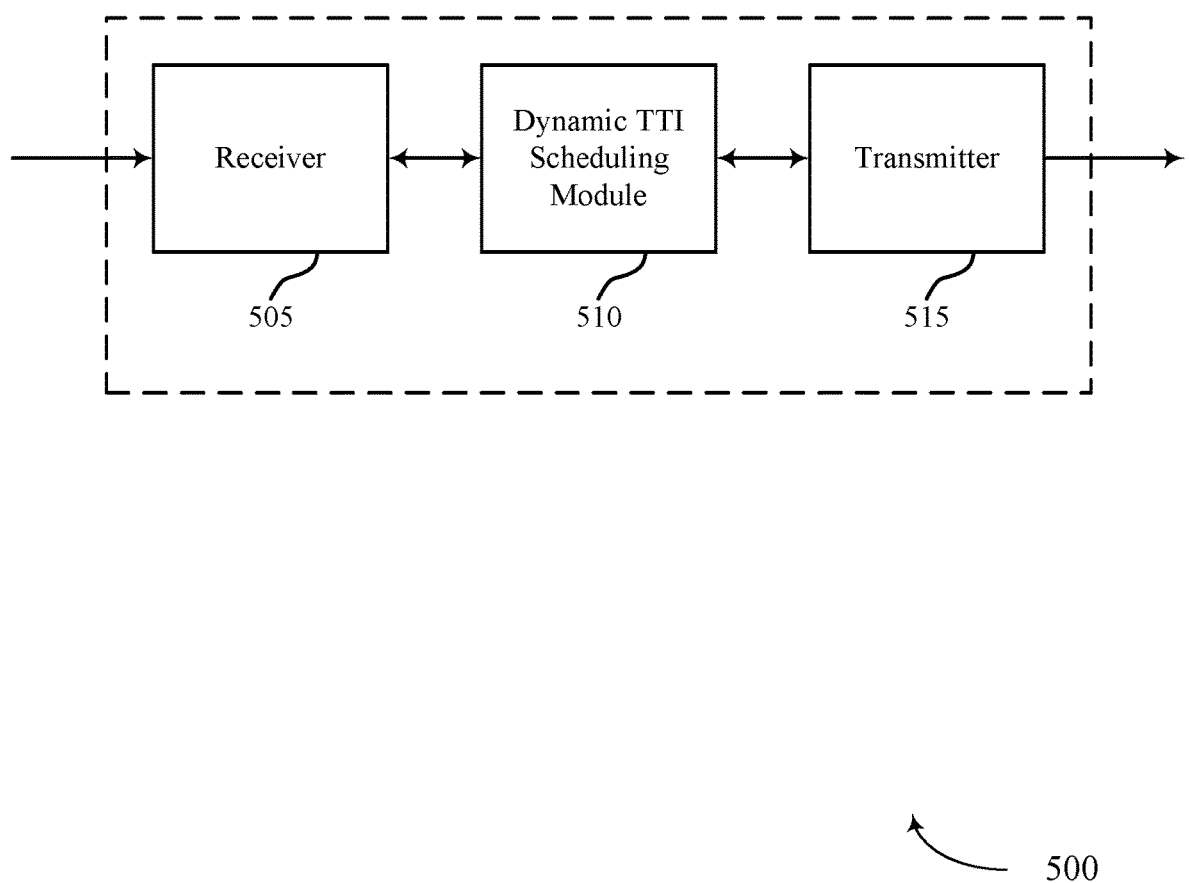
FIGS. 5 and 6 show block diagrams of wireless devices that support management of dynamic TTI scheduling for low latency operation in accordance with various aspects of the present disclosure.

FIG. 5 shows a block diagram of a wireless device 500 that supports management of dynamic TTI scheduling for low latency operation in accordance with various aspects of the present disclosure. Wireless device 500 may be an example of aspects of a UE 115 or a base station 105 described with reference to FIGS. 1-4. Wireless device 500 may include a receiver 505, a dynamic TTI scheduling module 510, and a transmitter 515. Wireless device 500 may also include a processor. Each of these components may be in communication with each other.

The receiver 505 may receive information such as packets, user data, or control information associated with various information channels (e.g., control channels, data channels, and information related to management of dynamic TTI scheduling in ULL, etc.). Information may be passed on to the dynamic TTI scheduling module 510, and to other components of wireless device 500.

The dynamic TTI scheduling module 510 may identify a carrier configuration that may include a plurality of TTI lengths, identify a TTI group including two or more TTI lengths from the plurality of TTI lengths, and communicate (e.g., in cooperation with the transmitter 515, etc.) using the carrier configuration based on the identified TTI group.

The transmitter 515 may transmit signals received from other components of wireless device 500. In some examples, the transmitter 515 may be collocated with the receiver 505 in a transceiver module. The transmitter 515 may include a single antenna, or it may include a plurality of antennas. In some examples, the transmitter 515 may be collocated with a receiver in a transceiver module. For example, the transmitter 515 may be an example of aspects of the transceiver(s) 835 and/or antenna(s) 840 described with reference to FIG. 8, or the transceiver(s) 935 and/or antenna(s) 940 described with reference to FIG. 9.

Figure 6:
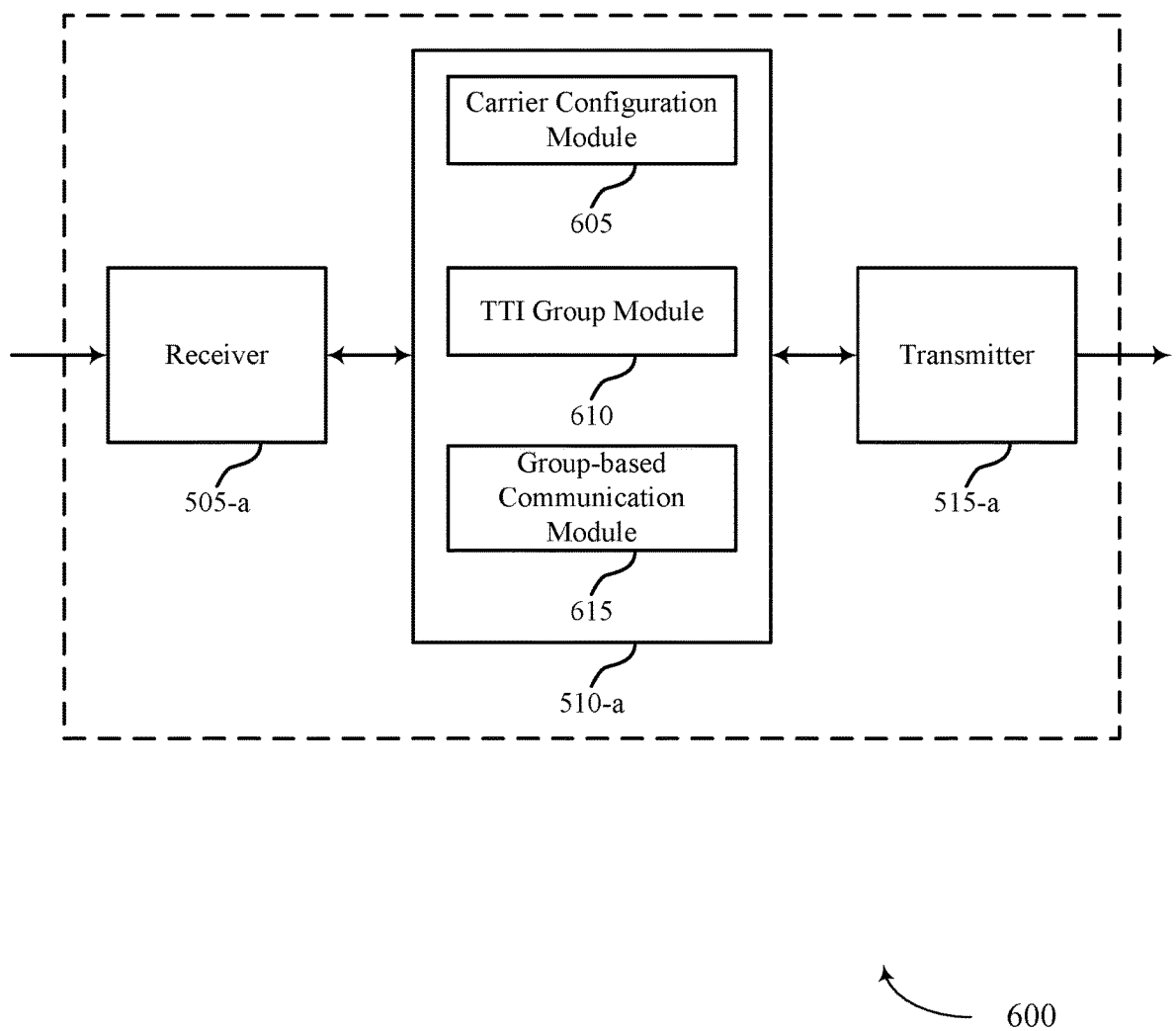

FIG. 6 shows a block diagram of a wireless device 600 that supports management of dynamic TTI scheduling for low latency operation in accordance with various aspects of the present disclosure. Wireless device 600 may be an example of aspects of a wireless device 500 or a UE 115 or a base station 105 described with reference to FIGS. 1-5. Wireless device 600 may include a receiver 505-*a*, a dynamic TTI scheduling module 510-*a*, or a transmitter 515-*a*. Wireless device 600 may also include a processor. Each of these components may be in communication with each other. The dynamic TTI scheduling module 510-*a* may also include a carrier configuration module 605, a TTI group module 610, and a group-based communication module 615.

The receiver 505-*a* may receive information which may be passed on to dynamic TTI scheduling module 510-*a*, and to other components of wireless device 600. The dynamic TTI scheduling module 510-*a* may perform the operations described with reference to FIG. 5. The transmitter 515-*a* may transmit signals received from other components of wireless device 600.

The carrier configuration module 605 may identify a carrier configuration, which may include a plurality of TTI lengths as described with reference to FIGS. 2-4.

The TTI group module 610 may identify a TTI group that may include two or more TTI lengths from the plurality of TTI lengths as described with reference to FIGS. 2-4. The TTI group module 610 may also identify a second TTI group, which may include one or more TTI lengths from the plurality of TTI lengths. In some examples, the plurality of TTI lengths include a one symbol TTI length, a two symbol TTI length, a slot TTI length, a subframe TTI length, or any combination thereof. The TTI group module 610 may also identify the TTI group based on a TTI group capability. The TTI group module 610 may also identify the TTI group based on a received indication. In some examples, the TTI group may be based on a UE capability, and the capability may be based on a low latency operation.

The group-based communication module 615 may communicate (e.g., in cooperation with the transmitter 515-*a*, etc.) using the carrier configuration based on the identified TTI group as described with reference to FIGS. 2-4. The group-based communication module 615 may also communicate using the carrier configuration based on the second TTI group. The group-based communication module 615 may also identify a TTI length for a scheduled transmission based on the TTI group and a rank of the scheduled transmission.

Figure 7:
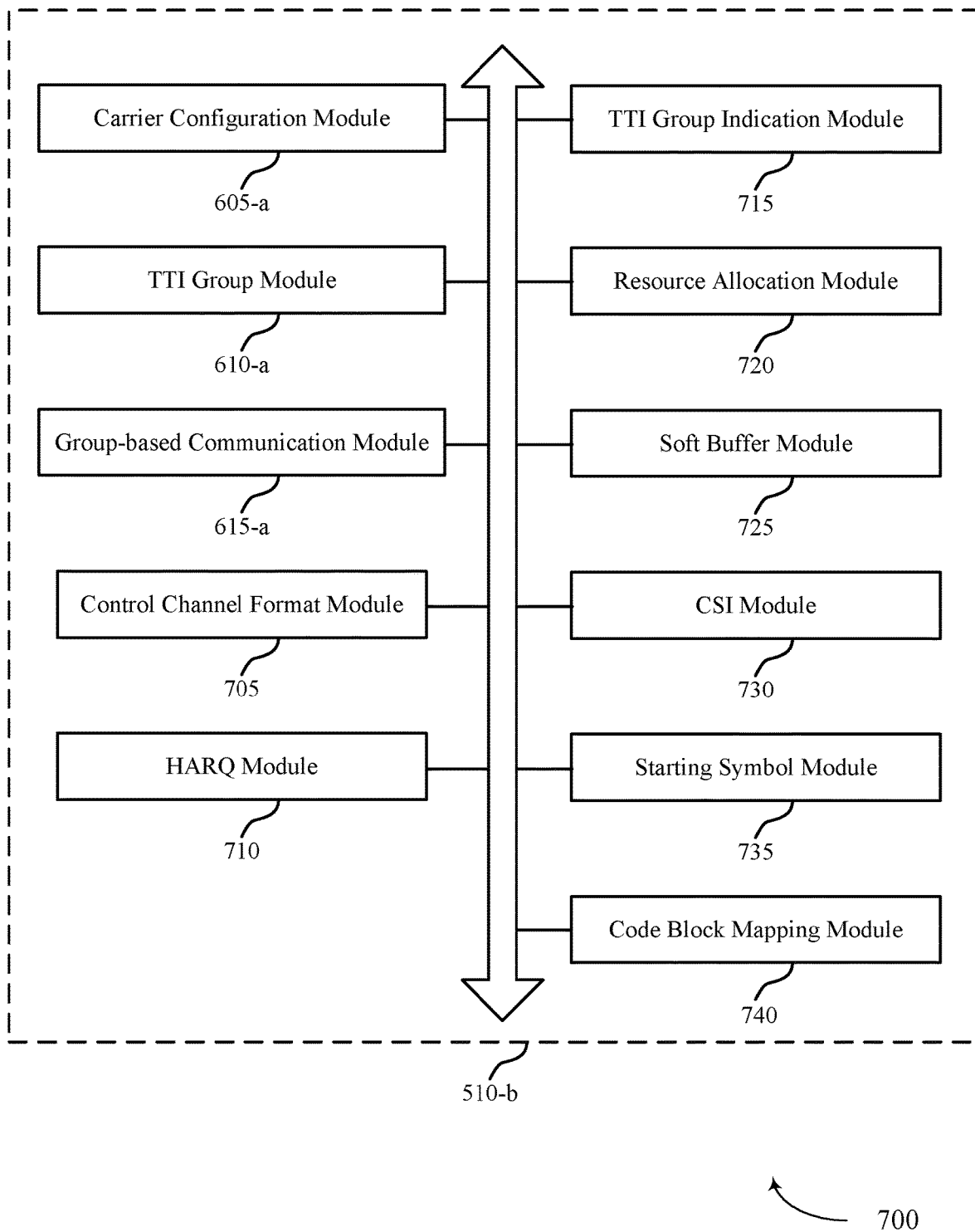
FIG. 7 shows a block diagram of a dynamic TTI scheduling module that supports management of dynamic TTI scheduling for low latency operation in accordance with various aspects of the present disclosure.

FIG. 7 shows a block diagram 700 of a dynamic TTI scheduling module 510-*b* that supports management of dynamic TTI scheduling for reduced latency operation in accordance with various aspects of the present disclosure. The dynamic TTI scheduling module 510-*b* may be a component of a wireless device 500 or a wireless device 600. The dynamic TTI scheduling module 510-*b* may be an example of aspects of a dynamic TTI scheduling module 510 described with reference to FIGS. 5-6. The dynamic TTI scheduling module 510-*b* may include a carrier configuration module 605-*a*, a TTI group module 610-*a*, and a group-based communication module 615-*a*. Each of these modules may perform the functions described with reference to FIG. 6. The dynamic TTI scheduling module 510-*b* may also include a control channel format module 705, a HARQ module 710, a TTI group indication module 715, a resource allocation module 720, a soft buffer module 725, a CSI module 730, a starting symbol module 735, and a code block mapping module 740.

The control channel format module 705 may be configured such that communicating using the carrier configuration may include communicating using a same control channel format for each TTI length in the TTI group as described with reference to FIGS. 2-4. In some examples, the control channel format may include a field indicating a TTI length from the TTI group; and the communication may, in some cases, be based on the TTI length.

The HARQ module 710 may communicate for a transport block using a first HARQ transmission based on a first TTI length in the TTI group as described with reference to FIGS. 2-4. The HARQ module 710 may also communicate for the transport block using a second HARQ transmission based on a second TTI length, different from the first TTI length, in the TTI group. In some examples, the carrier configuration includes a shared HARQ process for the TTI group. The carrier configuration may also have a shared HARQ timing based on the TTI group.

The TTI group indication module 715 may transmit an indication of a TTI group capability as described with reference to FIGS. 2-4. The TTI group indication module 715 may also receive an indication of a TTI group capability.

The resource allocation module 720 may identify a shared resource allocation granularity for the TTI group as described with reference to FIGS. 2-4.

The soft buffer module 725 may be configured such that the carrier configuration may include a shared soft buffer for the TTI group as described with reference to FIGS. 2-4. In some examples, the soft buffer size may be based on a longest TTI length in the TTI group.

The CSI module 730 may be configured such that the carrier configuration may include a shared CSI reporting configuration for the TTI group as described with reference to FIGS. 2-4. In some examples, the shared CSI reporting configuration may be based on a shortest TTI length in the TTI group.

The starting symbol module 735 may be configured such that at least one TTI length in the TTI group may be associated with a limited number of starting symbol periods as described with reference to FIGS. 2-4.

The code block mapping module 740 may map each code block in a transport block to a first symbol of a TTI based on a TTI length from the TTI group, and the TTI length may be greater than one symbol period as described with reference to FIGS. 2-4. The code block mapping module 740 may also map each code block in the transport to a second symbol of the TTI based on the TTI group.

Figure 8:
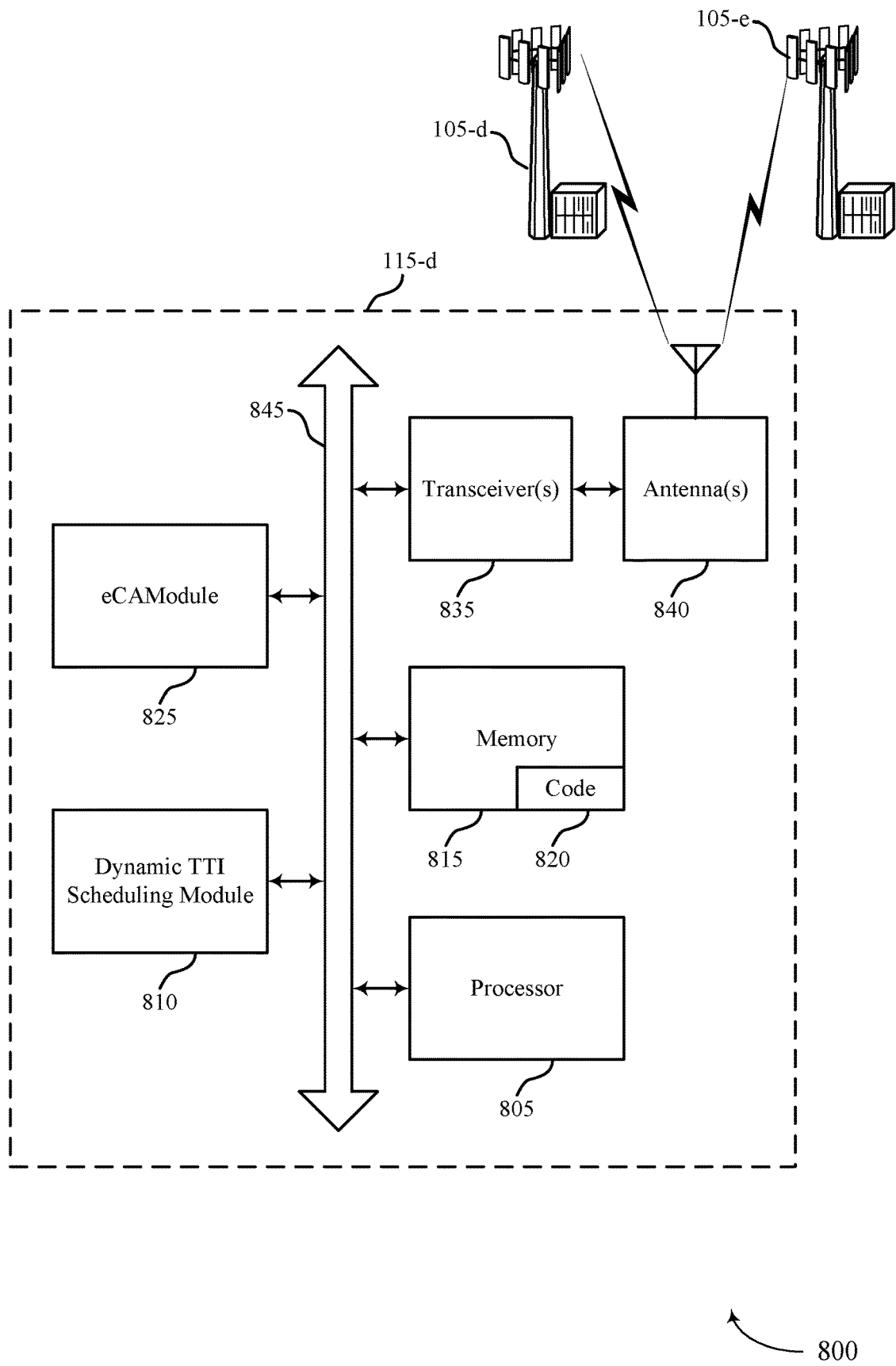
FIG. 8 illustrates a block diagram of a system including a UE that supports management of dynamic TTI scheduling for low latency operation in accordance with various aspects of the present disclosure.

FIG. 8 illustrates a block diagram of a system 800 including a UE 115 that supports management of dynamic TTI scheduling for low latency operation in accordance with various aspects of the present disclosure. System 800 may include UE 115-*d*, which may be an example of a wireless device 500, a wireless device 600, or a UE 115 described with reference to FIGS. 1, 2 and 5-7. UE 115-D may include a dynamic TTI scheduling module 810, which may be an example of a dynamic TTI scheduling module 510 described with reference to FIGS. 5-7. UE 115-*d* may also include an enhanced carrier aggregation (eCA) module 825. UE 115-*d* may also include components for bi-directional voice and data communications including components for transmitting communications and components for receiving communications. For example, UE 115-*d* may communicate bi-directionally with base station 105-*d* or base station 105-*e*.

eCA module 825 may manage eCA operations as described above with reference to FIG. 1. For example, eCA operations may include communicating using one or more eCCs, communications using a large number of CCs (e.g., over 5), communication using an unlicensed radio frequency spectrum band, communication using a shared radio frequency spectrum band (e.g., a radio frequency spectrum band with multiple users contending for access), or any combination thereof.

UE 115-*d* may also include a processor 805, memory 815 (including software/firmware code 820), transceiver(s) 835, and one or more antenna(s) 840, each of which may communicate, directly or indirectly, with one another (e.g., via buses 845). The transceiver(s) 835 may communicate bi-directionally, via the antenna(s) 840 or wired or wireless links, with one or more networks, as described above. For example, the transceiver(s) 835 may communicate bi-directionally with a base station 105 or another UE 115. The transceiver(s) 835 may include a modem to modulate the packets and provide the modulated packets to the antenna(s) 840 for transmission, and to demodulate packets received from the antenna(s) 840. While UE 115-*d* may include a single antenna 840, UE 115-*d* may also have multiple antennas 840 capable of concurrently transmitting or receiving multiple wireless transmissions. In some examples the transceiver(s) 835 may be an example of a combination of a receiver 505 and a transmitter 515 as described with reference to FIG. 5 or 6.

The memory 815 may include random access memory (RAM) and read only memory (ROM). The memory 815 may store computer-readable, computer-executable software/firmware code 820 including instructions that, when executed, cause the UE 115-*d* to perform various functions described herein (e.g., management of dynamic TTI scheduling in ULL, etc.). Alternatively, the software/firmware code 820 may not be directly executable by the processor 805 but cause a computer (e.g., when compiled and executed) to perform functions described herein. The processor 805 may include an intelligent hardware device, (e.g., a central processing unit (CPU), a microcontroller, an application-specific integrated circuit (ASIC), etc.)

Figure 9:
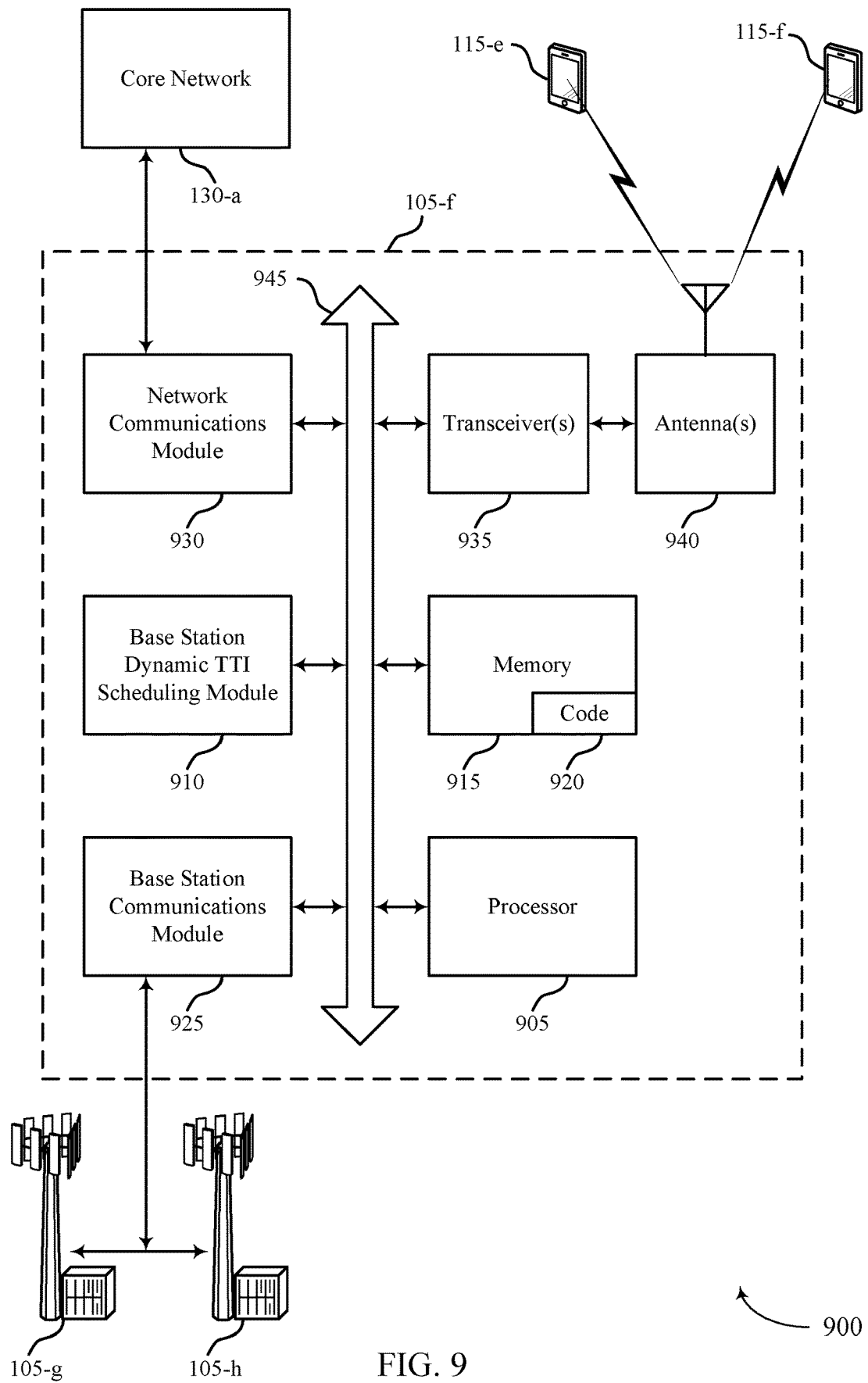
FIG. 9 illustrates a block diagram of a system including a base station that supports management of dynamic TTI scheduling for low latency operation in accordance with various aspects of the present disclosure.

FIG. 9 illustrates a block diagram of a system 900 including a base station 105 that supports management of dynamic TTI scheduling for low latency operation in accordance with various aspects of the present disclosure. System 900 may include base station 105-*f*, which may be an example of a wireless device 500, a wireless device 600, or a base station 105 described with reference to FIGS. 1, 2 and 6-8. Base station 105-*f* may include a base station dynamic TTI scheduling module 910, which may be an example of a dynamic TTI scheduling module 510 described with reference to FIGS. 5-7. Base station 105-*f* may also include components for bi-directional voice and data communications including components for transmitting communications and components for receiving communications. For example, base station 105-*f* may communicate bi-directionally with UE 115-*e* or UE 115-*f*.

In some cases, base station 105-*f* may have one or more wired backhaul links. Base station 105-*f* may have a wired backhaul link (e.g., S1 interface, etc.) to the core network 130. Base station 105-*f* may also communicate with other base stations 105, such as base station 105-*g* and base station 105-*h* via inter-base station backhaul links (e.g., an X2 interface). Each of the base stations 105 may communicate with UEs 115 using the same or different wireless communications technologies. In some cases, base station 105-*f* may communicate with other base stations such as 105-*f* or 105-*f* utilizing base station communication module 925. In some examples, base station communication module 925 may provide an X2 interface within an LTE/LTE-A wireless communication network technology to provide communication between some of the base stations 105. In some examples, base station 105-*f* may communicate with other base stations through core network 130. In some cases, base station 105-*f* may communicate with the core network 130 through network communications module 930.

The base station 105-*f* may include a processor 905, memory 915 (including software/firmware code 920), transceiver(s) 935, and antenna(s) 940, which each may be in communication, directly or indirectly, with one another (e.g., over bus system 945). The transceiver(s) 935 may be configured to communicate bi-directionally, via the antenna(s) 940, with the UEs 115, which may be multi-mode devices. The transceiver(s) 935 (or other components of the base station 105-*f*) may also be configured to communicate bi-directionally, via the antenna(s) 940, with one or more other base stations (not shown). The transceiver(s) 935 may include a modem configured to modulate the packets and provide the modulated packets to the antenna(s) 940 for transmission, and to demodulate packets received from the antenna(s) 940. The base station 105-*f* may include multiple transceivers 935, each with one or more associated antenna(s) 940. The transceiver(s) 935 may be an example of a combination of a receiver 505 and a transmitter 515 as described with reference to FIG. 5 or 6.

The memory 915 may include RAM and ROM. The memory 915 may also store computer-readable, computer-executable software/firmware code 920 containing instructions that are configured to, when executed, cause the base station 105-*f* to perform various functions described herein (e.g., management of dynamic TTI scheduling in reduced latency operation, selecting coverage enhancement techniques, call processing, database management, message routing, etc.). Alternatively, the software/firmware code 920 may not be directly executable by the processor 905 but be configured to cause a computer (e.g., when compiled and executed) to perform functions described herein. The processor 905 may include an intelligent hardware device (e.g., a CPU, a microcontroller, an ASIC, etc). The processor 905 may include various special purpose processors such as encoders, queue processing modules, base band processors, radio head controllers, digital signal processor (DSPs), and the like.

The base station communication module 925 may manage communications with other base stations 105. In some cases, a communications management module may include a controller or scheduler for controlling communications with UEs 115 in cooperation with other base stations 105. For example, the base station communication module 925 may coordinate scheduling for transmissions to UEs 115 for various interference mitigation techniques such as beamforming or joint transmission.

The components of wireless device 500, wireless device 600, dynamic TTI scheduling modules 510, system 800, or system 900 may, individually or collectively, be implemented with at least one ASIC adapted to perform some or all of the applicable functions in hardware. Alternatively, the functions may be performed by one or more other processing units (or cores), on at least one integrated circuit (IC). In other examples, other types of integrated circuits may be used (e.g., Structured/Platform ASICs, a field-programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 10:
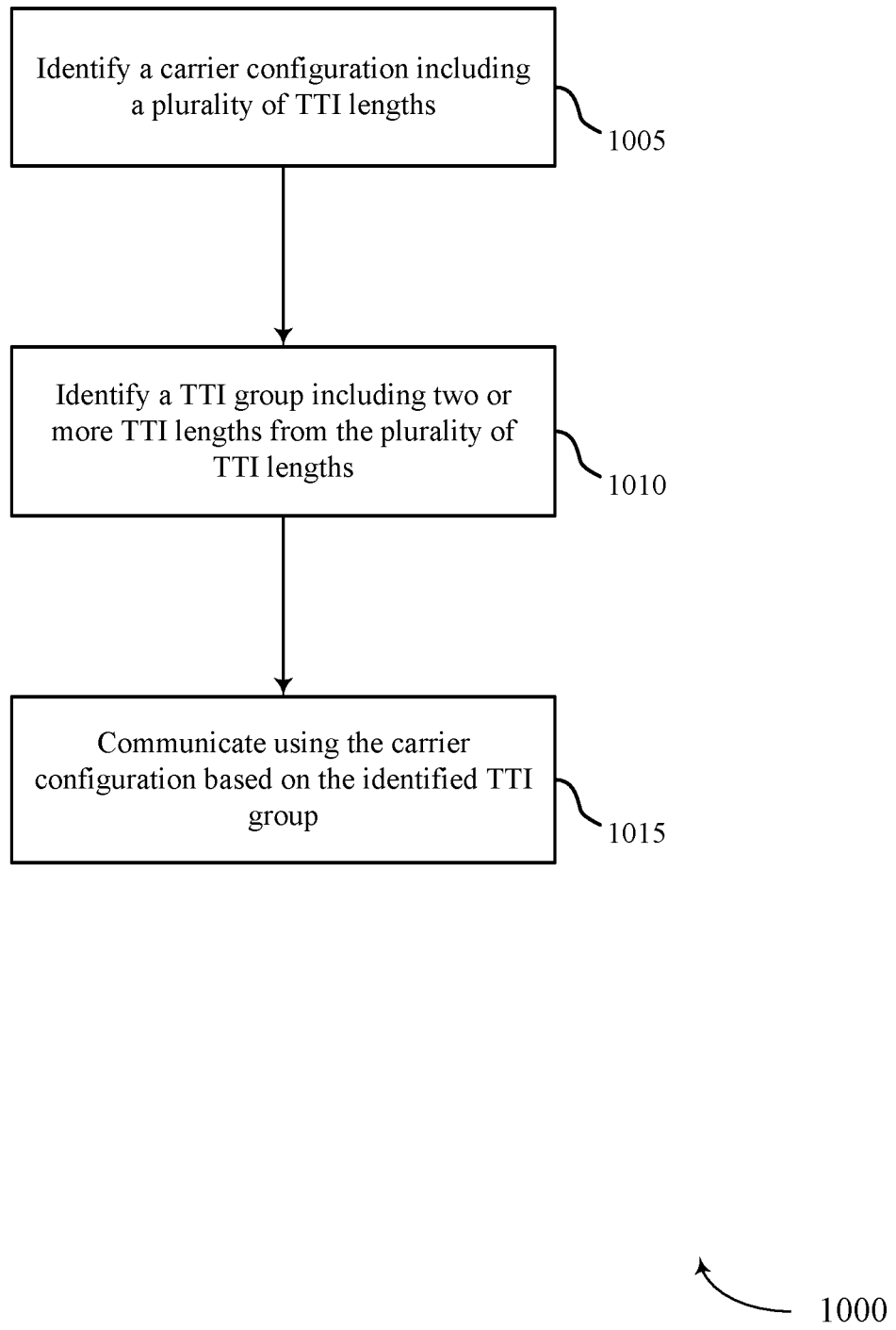
FIGS. 10-15 show flowcharts illustrating methods for management of dynamic TTI scheduling for low latency operation in accordance with various aspects of the present disclosure.

FIG. 10 shows a flowchart illustrating a method 1000 for management of dynamic TTI scheduling for low latency operation in accordance with various aspects of the present disclosure. The operations of method 1000 may be implemented by a device such as a UE 115 or a base station 105 or its components as described with reference to FIGS. 1-9. For example, the operations of method 1000 may be performed by dynamic TTI scheduling modules 510, 810, or 910 as described with reference to FIGS. 5-9 In some examples, a device may execute a set of codes to control the functional elements of the device to perform the functions described below. Additionally or alternatively, the device may perform aspects the functions described below using special-purpose hardware.

At block 1005, the device may identify a carrier configuration including a plurality of TTI lengths as described with reference to FIGS. 2-4. In certain examples, the operations of block 1005 may be performed by a carrier configuration module 605 as described with reference to FIG. 6 or 7.

At block 1010, the device may identify a TTI group including two or more TTI lengths from the plurality of TTI lengths as described with reference to FIGS. 2-4. In certain examples, the operations of block 1010 may be performed by a TTI group module 610 as described with reference to FIG. 6 or 7.

At block 1015, the device may communicate using the carrier configuration based on the identified TTI group as described with reference to FIGS. 2-4. In certain examples, the operations of block 1015 may be performed by a group-based communication module 615 as described with reference to FIG. 6 or 7 and/or a transmitter 515 as described with reference to FIG. 5 or 6.

Figure 11:
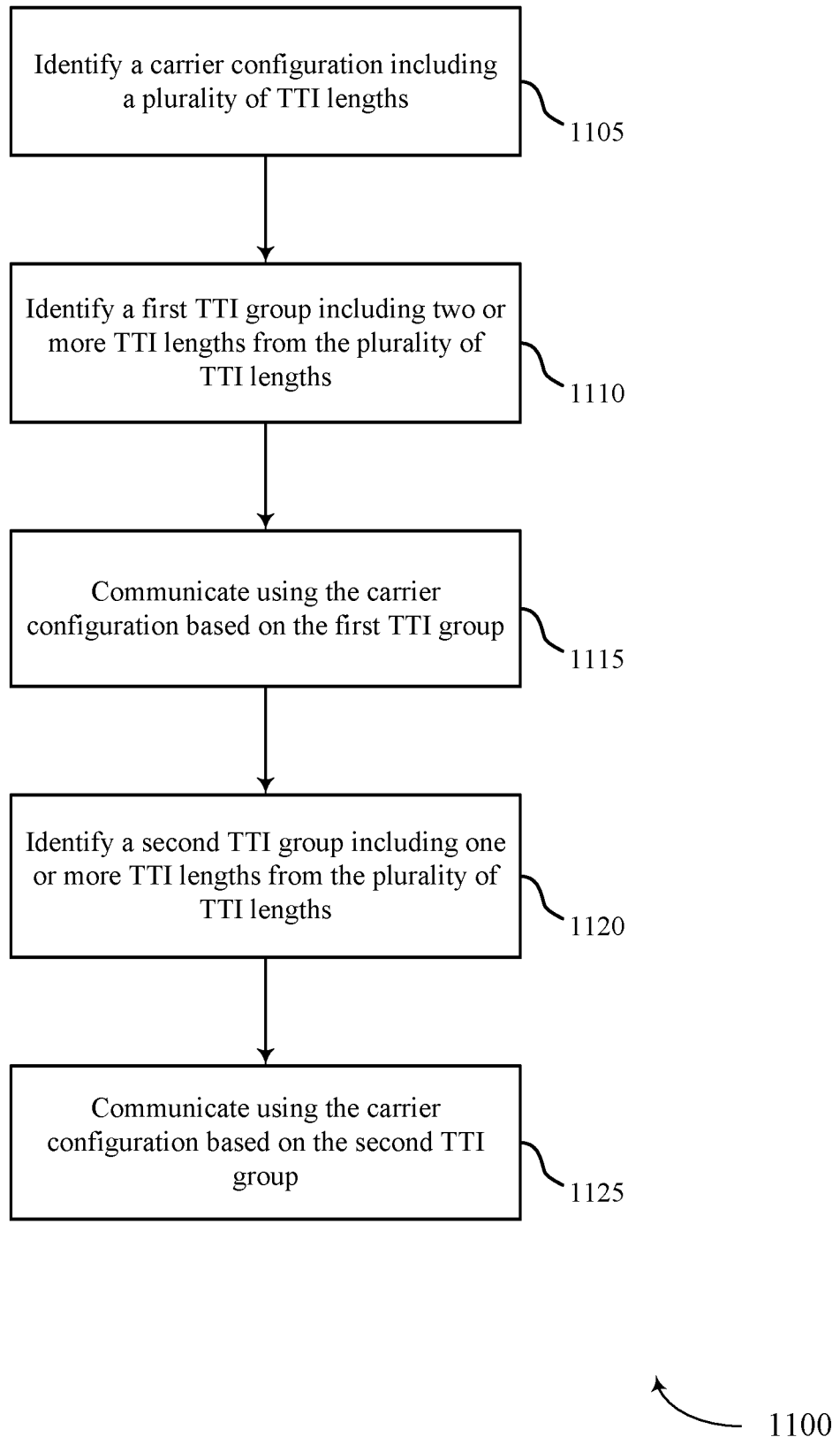

FIG. 11 shows a flowchart illustrating a method 1100 for management of dynamic TTI scheduling for low latency operation in accordance with various aspects of the present disclosure. The operations of method 1100 may be implemented by a device such as a UE 115 or a base station 105 or its components as described with reference to FIGS. 1-9. For example, the operations of method 1100 may be performed by dynamic TTI scheduling modules 510, 810, or 910 as described with reference to FIGS. 5-9. In some examples, a device may execute a set of codes to control the functional elements of the device to perform the functions described below. Additionally or alternatively, the device may perform aspects the functions described below using special-purpose hardware. The method 1100 may also incorporate aspects of method 1000 of FIG. 10.

At block 1105, the device may identify a carrier configuration including a plurality of TTI lengths as described with reference to FIGS. 2-4. In certain examples, the operations of block 1105 may be performed by a carrier configuration module 605 as described with reference to FIG. 6 or 7.

At block 1110, the device may identify a first TTI group including two or more TTI lengths from the plurality of TTI lengths as described with reference to FIGS. 2-4. In certain examples, the operations of block 1110 may be performed by a TTI group module 610 as described with reference to FIG. 6 or 7.

At block 1115, the device may communicate using the carrier configuration based on the first TTI group as described with reference to FIGS. 2-4. In certain examples, the operations of block 1115 may be performed by a group-based communication module 615 as described with reference to FIG. 6 or 7, and/or a transmitter 515 as described with reference to FIG. 5 or 6.

At block 1120, the device may identify a second TTI group including one or more TTI lengths from the plurality of TTI lengths as described with reference to FIGS. 2-4. In certain examples, the operations of block 1120 may be performed by a TTI group module 610 as described with reference to FIG. 6 or 7.

At block 1125, the device may communicate using the carrier configuration based on the second TTI group as described with reference to FIGS. 2-4. In certain examples, the operations of block 1125 may be performed by a group-based communication module 615 as described with reference to FIG. 6 or 7, and/or a transmitter 515 as described with reference to FIG. 5 or 6.

Figure 12:
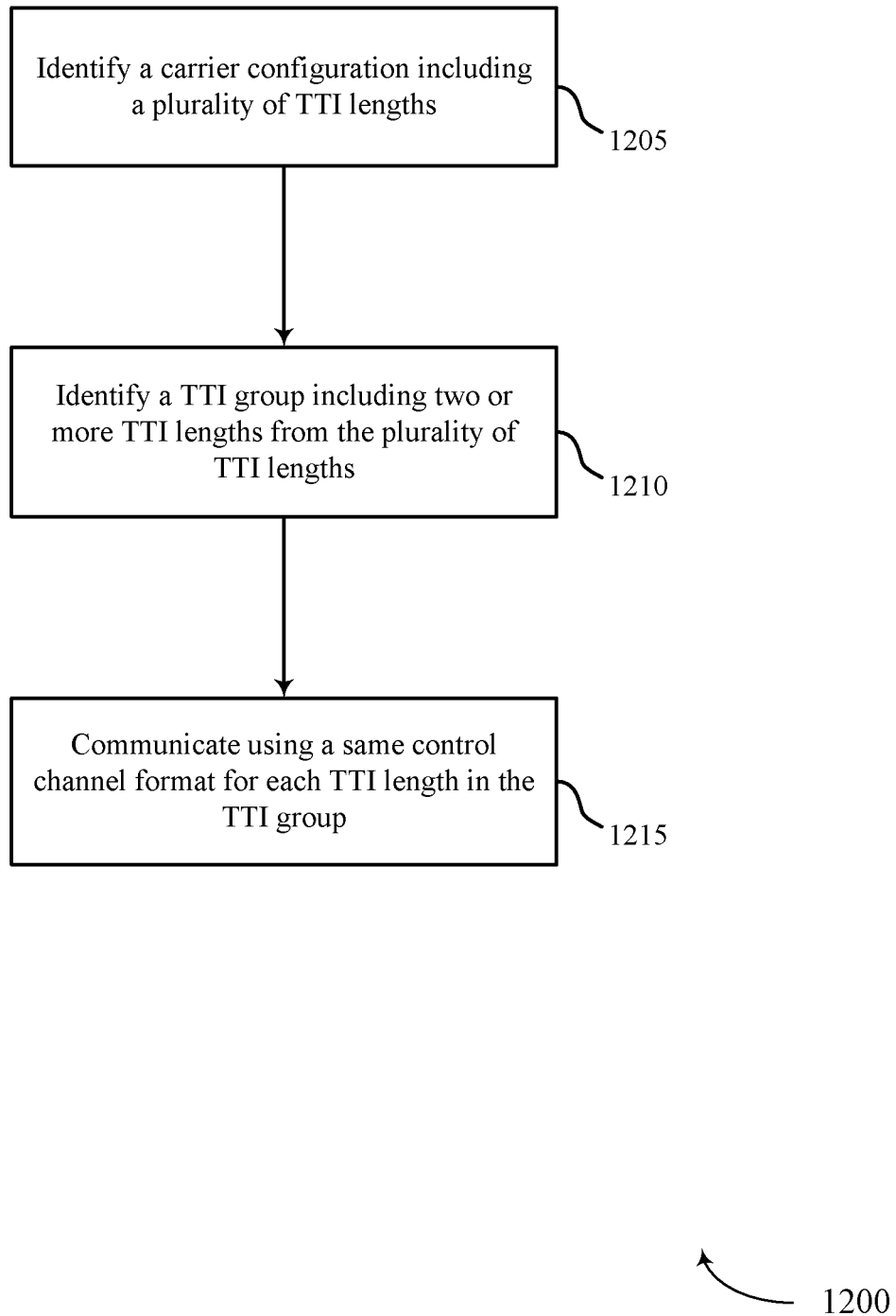

FIG. 12 shows a flowchart illustrating a method 1200 for management of dynamic TTI scheduling for low latency operation in accordance with various aspects of the present disclosure. The operations of method 1200 may be implemented by a device such as a UE 115 or a base station 105 or its components as described with reference to FIGS. 1-9. For example, the operations of method 1200 may be performed by dynamic TTI scheduling modules 510, 810, or 910 as described with reference to FIGS. 5-9. In some examples, a device may execute a set of codes to control the functional elements of the device to perform the functions described below. Additionally or alternatively, the device may perform aspects the functions described below using special-purpose hardware. The method 1200 may also incorporate aspects of methods 1000, and 1100 of FIGS. 10-11.

At block 1205, the device may identify a carrier configuration including a plurality of TTI lengths as described with reference to FIGS. 2-4. In certain examples, the operations of block 1205 may be performed by a carrier configuration module 605 as described with reference to FIG. 6 or 7.

At block 1210, the device may identify a TTI group including two or more TTI lengths from the plurality of TTI lengths as described with reference to FIGS. 2-4. In certain examples, the operations of block 1210 may be performed by a TTI group module 610 as described with reference to FIG. 6 or 7.

At block 1215, the device may communicate using the carrier configuration based on the identified TTI group as described with reference to FIGS. 2-4. In some cases, communicating using the carrier configuration may include communicating using a same control channel format for each TTI length in the TTI group. In some examples, the operations of block 1215 may be performed by a group-based communication module 615 as described with reference to FIG. 6 or 7, and/or a transmitter 515 as described with reference to FIG. 5 or 6.

Figure 13:
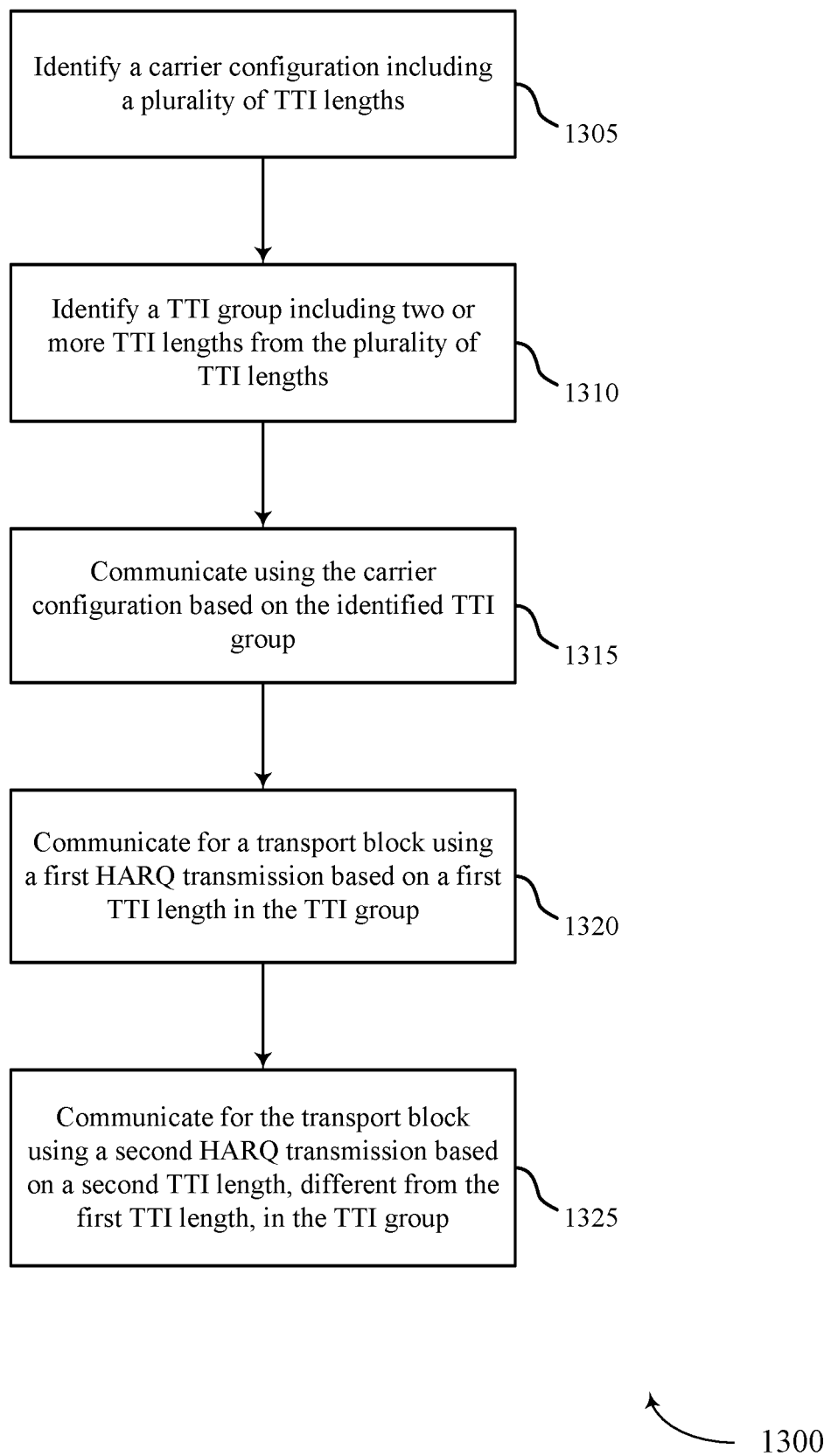

FIG. 13 shows a flowchart illustrating a method 1300 for management of dynamic TTI scheduling for low latency operation in accordance with various aspects of the present disclosure. The operations of method 1300 may be implemented by a device such as a UE 115 or a base station 105 or its components as described with reference to FIGS. 1-9. For example, the operations of method 1300 may be performed by dynamic TTI scheduling modules 510, 810, or 910 as described with reference to FIGS. 5-9. In some examples, a device may execute a set of codes to control the functional elements of the device to perform the functions described below. Additionally or alternatively, the device may perform aspects the functions described below using special-purpose hardware. The method 1300 may also incorporate aspects of methods 1000, 1100, and 1200 of FIGS. 10-12.

At block 1305, the device may identify a carrier configuration including a plurality of TTI lengths as described with reference to FIGS. 2-4. In certain examples, the operations of block 1305 may be performed by a carrier configuration module 605 as described with reference to FIG. 6 or 7.

At block 1310, the device may identify a TTI group including two or more TTI lengths from the plurality of TTI lengths as described with reference to FIGS. 2-4. In certain examples, the operations of block 1310 may be performed by a TTI group module 610 as described with reference to FIG. 6 or 7.

At block 1315, the device may communicate using the carrier configuration based on the identified TTI group as described with reference to FIGS. 2-4. In certain examples, the operations of block 1315 may be performed by a group-based communication module 615 as described with reference to FIG. 6 or 7, and/or a transmitter 515 as described with reference to FIG. 5 or 6.

At block 1320, the device may communicate for a transport block using a first HARQ transmission based on a first TTI length in the TTI group as described with reference to FIGS. 2-4. In certain examples, the operations of block 1320 may be performed by a HARQ module 710 as described with reference to FIG. 7, and/or a transmitter 515 as described with reference to FIG. 5 or 6.

At block 1325, the device may communicate for the transport block using a second HARQ transmission based on a second TTI length, different from the first TTI length, in the TTI group as described with reference to FIGS. 2-4. In certain examples, the operations of block 1325 may be performed by a HARQ module 710 as described with reference to FIG. 7, and/or a transmitter 515 as described with reference to FIG. 5 or 6.

Figure 14:
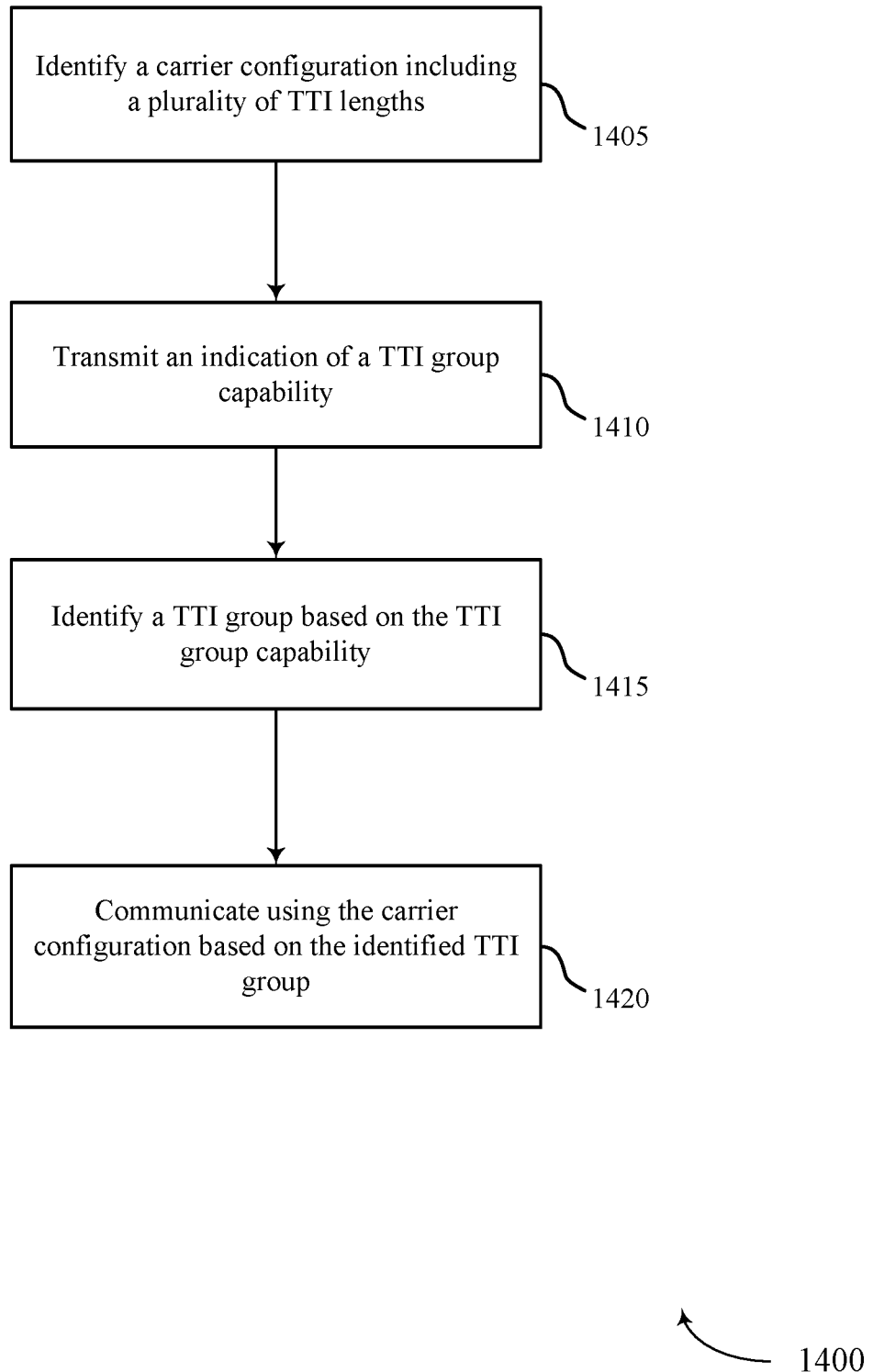

FIG. 14 shows a flowchart illustrating a method 1400 for management of dynamic TTI scheduling for low latency operation in accordance with various aspects of the present disclosure. The operations of method 1400 may be implemented by a device such as a UE 115 or its components as described with reference to FIGS. 1-9. For example, the operations of method 1400 may be performed by dynamic TTI scheduling modules 510, 810, or 910 as described with reference to FIGS. 5-9. In some examples, a device may execute a set of codes to control the functional elements of the device to perform the functions described below. Additionally or alternatively, the device may perform aspects the functions described below using special-purpose hardware. The method 1400 may also incorporate aspects of methods 1000, 1100, 1200, and 1300 of FIGS. 10-13.

At block 1405, the device may identify a carrier configuration including a plurality of TTI lengths as described with reference to FIGS. 2-4. In certain examples, the operations of block 1405 may be performed by a carrier configuration module 605 as described with reference to FIG. 6 or 7.

At block 1410, the device may transmit an indication of a TTI group capability as described with reference to FIGS. 2-4. In certain examples, the operations of block 1410 may be performed by a TTI group indication module 715 as described with reference to FIG. 7, and/or a transmitter 515 as described with reference to FIG. 5 or 6.

At block 1415, the device may identify a TTI group including two or more TTI lengths from the plurality of TTI lengths as described with reference to FIGS. 2-4. In certain examples, the operations of block 1415 may be performed by a TTI group module 610 as described with reference to FIG. 6. In some cases, the device may identify the TTI group based on the TTI group capability as described with reference to FIGS. 2-4.

At block 1420, the device may communicate using the carrier configuration based on the identified TTI group as described with reference to FIGS. 2-4. In certain examples, the operations of block 1420 may be performed by a group-based communication module 615 as described with reference to FIG. 6 or 7, and/or a transmitter 515 as described with reference to FIG. 5 or 6.

Figure 15:
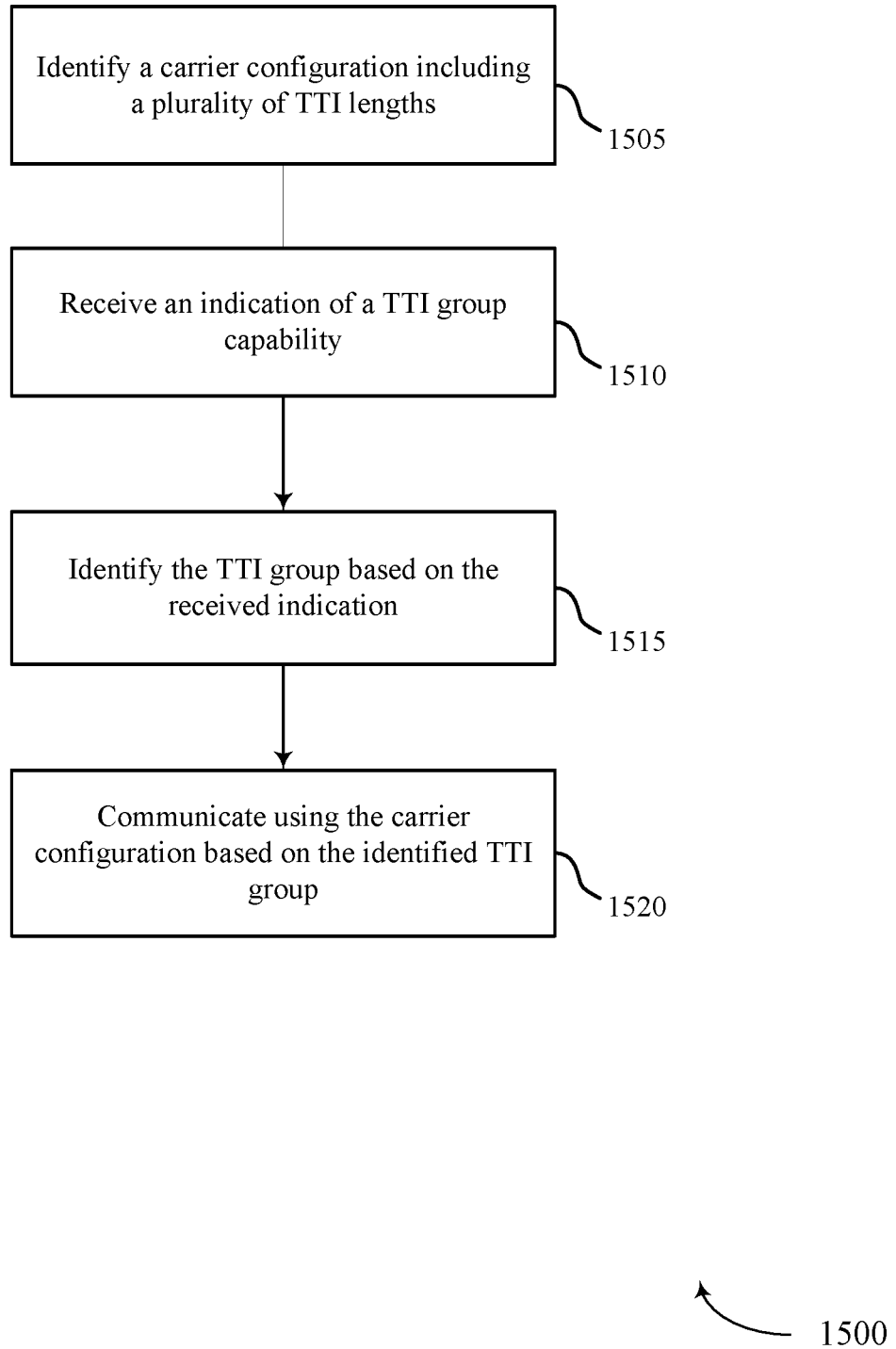

FIG. 15 shows a flowchart illustrating a method 1500 for management of dynamic TTI scheduling for low latency operation in accordance with various aspects of the present disclosure. The operations of method 1500 may be implemented by a device such as a base station 105 or its components as described with reference to FIGS. 1-9. For example, the operations of method 1500 may be performed by dynamic TTI scheduling modules 510, 810, or 910 as described with reference to FIGS. 5-9. In some examples, a device may execute a set of codes to control the functional elements of the device to perform the functions described below. Additionally or alternatively, the device may perform aspects the functions described below using special-purpose hardware. The method 1500 may also incorporate aspects of methods 1000, 1100, 1200, 1300, and 1400 of FIGS. 10-14.

At block 1505, the device may identify a carrier configuration including a plurality of TTI lengths as described with reference to FIGS. 2-4. In certain examples, the operations of block 1505 may be performed by a carrier configuration module 605 as described with reference to FIG. 6 or 7.

At block 1510, the device may receive an indication of a TTI group capability as described with reference to FIGS. 2-4. In certain examples, the operations of block 1510 may be performed by a TTI group indication module 715 as described with reference to FIG. 7.

At block 1515, the device may identify a TTI group including two or more TTI lengths from the plurality of TTI lengths as described with reference to FIGS. 2-4. In some cases, the device may identify the TTI group based on the received indication. In certain examples, the operations of block 1515 may be performed by a TTI group module 610 as described with reference to FIG. 6 or 7.

At block 1520, the device may communicate using the carrier configuration based on the identified TTI group as described with reference to FIGS. 2-4. In certain examples, the operations of block 1520 may be performed by a group-based communication module 615 as described with reference to FIG. 6 or 7, and/or a transmitter 515 as described with reference to FIG. 5 or 6.

Thus, methods 1000, 1100, 1200, 1300, 1400, and 1500 may provide for management of dynamic TTI scheduling in low latency operations. It should be noted that methods 1000, 1100, 1200, 1300, 1400, and 1500 describe possible implementation, and that the operations and the steps may be rearranged or otherwise modified such that other implementations are possible. In some examples, aspects from two or more of the methods 1000, 1100, 1200, 1300, 1400, and 1500 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-advanced (LTE-a) are new releases of Universal Mobile Telecommunications System (UMTS) that use E-UTRA. UTRA, E-UTRA, UMTS, LTE, LTE-a, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-a networks, including such networks described herein, the term evolved node B (eNB) may be generally used to describe the base stations. The wireless communications system or systems described herein may include a heterogeneous LTE/LTE-a network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications systems 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for FDD (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
identifying a carrier configuration comprising a plurality of different transmission time interval (TTI) lengths;
identifying a first group of TTI lengths comprising two or more TTI lengths from the plurality of different TTI lengths, wherein the first group of TTI lengths is associated with at least one configuration for communication using a TTI that is common to each TTI length of the first group of TTI lengths, wherein the at least one configuration is based at least in part on one or more of a shortest TTI length or a longest TTI length of the two or more TTI lengths of the first group of TTI lengths, and wherein the at least one configuration for communication using a TTI that is common to each TTI length of the first group of TTI lengths is different from at least one configuration for communication using a TTI that is common to each TTI length of one or more TTI lengths of the second group of TTI lengths, each of the one or more TTI lengths of the second group of TTI lengths being different from each of the two or more TTI lengths of the first group of TTI lengths, and wherein the at least one configuration for communication using a TTI that is common to each TTI length of the first group of TTI lengths comprises a common channel state information (CSI) reporting configuration for TTIs having a TTI length of the first group of TTI lengths, and the common CSI reporting configuration is based at least in part on the shortest TTI length of the two or more TTI lengths of the first group of TTI lengths; and
communicating using the identified carrier configuration and based at least in part on the identified first group of TTI lengths.

2. The method of claim 1, wherein the plurality of different TTI lengths comprises at least one of a one symbol TTI length, a two symbol TTI length, a slot TTI length, or a subframe TTI length, or any combination thereof.

3. The method of claim 1, wherein the at least one configuration for communication using a TTI that is common to each TTI length of the first group of TTI lengths comprises a control channel format that is common to TTIs having a TTI length of the first group of TTI lengths, and wherein communicating using the identified carrier configuration comprises:
communicating using the control channel format that is common to TTIs having a TTI length of the first group of TTI lengths.

4. The method of claim 3, wherein the control channel format that is common to each TTI length of the first group of TTI lengths comprises a field indicating the TTI length.

5. The method of claim 1, further comprising:
communicating for a transport block using a first hybrid automatic repeat request (HARQ) transmission based at least in part on a first TTI length in the first group of TTI lengths; and
communicating for the transport block using a second HARQ transmission based at least in part on a second TTI length, different from the first TTI length, in the first group of TTI lengths.

6. The method of claim 1, further comprising:
communicating an indication of a TTI group capability, wherein identifying the first group of TTI lengths is based at least in part on the indication of the TTI group capability.

7. The method of claim 1, further comprising:
identifying a TTI length for a scheduled communication based at least in part on identifying the first group of TTI lengths and a rank of the scheduled communication.

8. The method of claim 1, wherein the at least one configuration for communication using a TTI that is common to each TTI length of the first group of TTI lengths comprises:
(1) a common resource allocation granularity for TTIs having a TTI length of the two or more TTI lengths of the first group of TTI lengths that is different from a common resource allocation granularity for TTIs having a TTI length of the one or more TTI lengths of the second group of TTI lengths, or
(2) a common HARQ round trip timing for TTIs having a TTI length of the two or more TTI lengths of the first group of TTI lengths that is different from a common HARQ round trip timing for TTIs having a TTI length of the one or more TTI lengths of the second group of TTI lengths,
or a combination thereof.

9. The method of claim 1, wherein the at least one configuration for communication using a TTI that is common to each TTI length of the first group of TTI lengths comprises a common soft buffer for TTIs having a TTI length of the first group of TTI lengths.

10. The method of claim 9, wherein a size of the common soft buffer is based at least in part on the longest TTI length of the two or more TTI lengths of the first group of TTI lengths.

11. The method of claim 1, wherein at least one TTI length of the two or more TTI lengths of the first group of TTI lengths is associated with a limited number of initial symbol periods.

12. The method of claim 1, further comprising:
mapping each code block in a transport block to a first symbol of a TTI based at least in part on a TTI length from the first group of TTI lengths, wherein the TTI length is greater than one symbol period.

13. The method of claim 1, wherein the first group of TTI lengths is based at least in part on a user equipment (UE) capability, and wherein the UE capability is based at least in part on a low latency operation.

14. An apparatus for wireless communication, comprising:
a processor;
memory in electronic communication with the processor; and
instructions stored in the memory and executable by the processor to cause the apparatus to:
identify a carrier configuration comprising a plurality of different transmission time interval (TTI) lengths;
identify a first group of TTI lengths comprising two or more TTI lengths from the plurality of different TTI lengths, wherein the first group of TTI lengths is associated with at least one configuration for communication using a TTI that is common to each TTI length of the first group of TTI lengths, wherein the at least one configuration is based at least in part on one or more of a shortest TTI length or a longest TTI length of the two or more TTI lengths of the first group of TTI lengths, and wherein the at least one configuration for communication using a TTI that is common to each TTI length of the first group of TTI lengths is different from at least one configuration for communication using a TTI that is common to each TTI length of one or more TTI lengths of the second group of TTI lengths, each of the one or more TTI lengths of the second group of TTI lengths being different from each of the two or more TTI lengths of the first group of TTI lengths, and wherein the at least one configuration for communication using a TTI that is common to each TTI length of the first group of TTI lengths comprises a common channel state information (CSI) reporting configuration for TTIs having a TTI length of the first group of TTI lengths, and the common CSI reporting configuration is based at least in part on the shortest TTI length of the two or more TTI lengths of the first group of TTI lengths; and communicate using the identified carrier configuration and based at least in part on the identified first group of TTI lengths.

15. The apparatus of claim 14, wherein the plurality of different TTI lengths comprises at least one of a one symbol TTI length, a two symbol TTI length, a slot TTI length, or a subframe TTI length, or any combination thereof.

16. The apparatus of claim 14, wherein the at least one configuration for communication using a TTI that is common to each TTI length of the first group of TTI lengths comprises a control channel format that is common to TTIs having a TTI length of the first group of TTI lengths, and wherein the instructions to communicate using the identified carrier configuration are executable by the processor to cause the apparatus to:

communicate using the control channel format that is common to TTIs having a TTI length of the first group of TTI lengths.

17. The apparatus of claim 14, wherein the instructions are further executable by the processor to cause the apparatus to:

communicate for a transport block using a first hybrid automatic repeat request (HARQ) transmission based at least in part on a first TTI length in the first group of TTI lengths; and communicate for the transport block using a second HARQ transmission based at least in part on a second TTI length, different from the first TTI length, in the first group of TTI lengths.

18. The apparatus of claim 14, wherein the instructions are further executable by the processor to cause the apparatus to:

communicate an indication of a TTI group capability, and wherein the instructions to identify the first group of TTI lengths are based at least in part on the indication of the TTI group capability.

19. The apparatus of claim 14, wherein the instructions are further executable by the processor to cause the apparatus to:

identify a TTI length for a scheduled communication based at least in part on identifying the first group of TTI lengths and a rank of the scheduled communication.

20. The apparatus of claim 14, wherein the at least one configuration for communication using a TTI that is common to each TTI length of the first group of TTI lengths comprises:

(1) a common resource allocation granularity for TTIs having a TTI length of the two or more TTI lengths of the first group of TTI lengths that is different from a common resource allocation granularity for TTIs having a TTI length of the one or more TTI lengths of the second group of TTI lengths, or (2) a common HARQ round trip timing for TTIs having a TTI length of the two or more TTI lengths of the first group of TTI lengths that is different from a common HARQ round trip timing for TTIs having a TTI length of the one or more TTI lengths of the second group of TTI lengths, or a combination thereof.

21. The apparatus of claim 14, wherein the at least one configuration for communication using a TTI that is common to each TTI length of the first group of TTI lengths comprises a common soft buffer for TTIs having a TTI length of the first group of TTI lengths.

22. The apparatus of claim 14, wherein at least one TTI length of the two or more TTI lengths of the first group of TTI lengths is associated with a limited number of initial symbol periods.

23. The apparatus of claim 14, further comprising instructions to cause the apparatus to:

map each code block in a transport block to a first symbol of a TTI based at least in part on a TTI length from the first group of TTI lengths, wherein the TTI length is greater than one symbol period.

24. An apparatus for wireless communication, comprising:

means for identifying a carrier configuration comprising a plurality of different transmission time interval (TTI) lengths;

means for identifying a first group of TTI lengths comprising two or more TTI lengths from the plurality of different TTI lengths, wherein the first group of TTI lengths is associated with at least one configuration for communication using a TTI that is common to each TTI length of the first group of TTI lengths, wherein the at least one configuration is based at least in part on one or more of a shortest TTI length or a longest TTI length of the two or more TTI lengths of the first group of TTI lengths, and wherein the at least one configuration for communication using a TTI that is common to each TTI length of the first group of TTI lengths is different from at least one configuration for communication using a TTI that is common to each TTI length of one or more TTI lengths of the second group of TTI lengths, each of the one or more TTI lengths of the second group of TTI lengths being different from each of the two or more TTI lengths of the first group of TTI lengths, and wherein the at least one configuration for communication using a TTI that is common to each TTI length of the first group of TTI lengths comprises a common channel state information (CSI) reporting configuration for TTIs having a TTI length of the first group of TTI lengths, and the common CSI reporting configuration is based at least in part on the shortest TTI length of the two or more TTI lengths of the first group of TTI lengths; and means for communicating using the identified carrier configuration and based at least in part on the identified first group of TTI lengths.

25. The apparatus of claim 24, wherein the at least one configuration for communication using a TTI that is common to each TTI length of the first group of TTI lengths comprises:

(1) a common resource allocation granularity for TTIs having a TTI length of the two or more TTI lengths of the first group of TTI lengths that is different from a common resource allocation granularity for TTIs having a TTI length of the one or more TTI lengths of the second group of TTI lengths, or (2) a common HARQ round trip timing for TTIs having a TTI length of the two or more TTI lengths of the first group of TTI lengths that is different from a common HARQ round trip timing for TTIs having a TTI length of the one or more TTI lengths of the second group of TTI lengths, or a combination thereof.

26. A non-transitory computer-readable medium storing code for wireless communication, the code comprising instructions executable to:

identify a carrier configuration comprising a plurality of different transmission time interval (TTI) lengths;

identify a first group of TTI lengths comprising two or more TTI lengths from the plurality of different TTI lengths, wherein the first group of TTI lengths is associated with at least one configuration for communication using a TTI that is common to each TTI length of the first group of TTI lengths, wherein the at least one configuration is based at least in part on one or more of a shortest TTI length or a longest TTI length of the two or more TTI lengths of the first group of TTI lengths, and wherein the at least one configuration for communication using a TTI that is common to each TTI length of the first group of TTI lengths is different from at least one configuration for communication using a TTI that is common to each TTI length of one or more TTI lengths of the second group of TTI lengths, each of the one or more TTI lengths of the second group of TTI lengths being different from each of the two or more TTI lengths of the first group of TTI lengths, and wherein the at least one configuration for communication using a TTI that is common to each TTI length of the first group of TTI lengths comprises a common channel state information (CSI) reporting configuration for TTIs having a TTI length of the first group of TTI lengths, and the common CSI reporting configuration is based at least in part on the shortest TTI length of the two or more TTI lengths of the first group of TTI lengths; and communicate using the identified carrier configuration and based at least in part on the identified first group of TTI lengths.

27. The non-transitory computer-readable medium of claim 26, wherein the at least one configuration for communication using a TTI that is common to each TTI length of the first group of TTI lengths comprises:

(1) a common resource allocation granularity for TTIs having a TTI length of the two or more TTI lengths of the first group of TTI lengths that is different from a common resource allocation granularity for TTIs having a TTI length of the one or more TTI lengths of the second group of TTI lengths, or (2) a common HARQ round trip timing for TTIs having a TTI length of the two or more TTI lengths of the first group of TTI lengths that is different from a common HARQ round trip timing for TTIs having a TTI length of the one or more TTI lengths of the second group of TTI lengths, or a combination thereof.

* * * * *